United States Patent
Els et al.

(10) Patent No.: US 10,282,758 B1
(45) Date of Patent: May 7, 2019

(54) PRICING CONTROL IN A REAL-TIME NETWORK-BASED BIDDING ENVIRONMENT

(71) Applicant: MaxPoint Interactive, Inc., Morrisville, NC (US)

(72) Inventors: Michael Els, Cambridge, MA (US); Igor Postelnik, Austin, TX (US)

(73) Assignee: MAXPOINT INTERACTIVE, INC., Morrisville, NC (US)

( * ) Notice: Subject to any disclaimer, the term of this patent is extended or adjusted under 35 U.S.C. 154(b) by 194 days.

(21) Appl. No.: 14/711,130

(22) Filed: May 13, 2015

Related U.S. Application Data

(63) Continuation-in-part of application No. 13/857,123, filed on Apr. 4, 2013.

(60) Provisional application No. 61/621,379, filed on Apr. 6, 2012.

(51) Int. Cl.
*G06Q 30/02* (2012.01)

(52) U.S. Cl.
CPC ..... *G06Q 30/0275* (2013.01); *G06Q 30/0244* (2013.01); *G06Q 30/0251* (2013.01); *G06Q 30/0255* (2013.01); *G06Q 30/0269* (2013.01); *G06Q 30/0271* (2013.01); *G06Q 30/0277* (2013.01)

(58) Field of Classification Search
CPC ................................. G06Q 30/0207–30/0277
See application file for complete search history.

(56) References Cited

U.S. PATENT DOCUMENTS

| | | | | |
|---|---|---|---|---|
| 8,234,170 | B2 | 7/2012 | Kassakian et al. | 705/14.71 |
| 8,255,285 | B1 * | 8/2012 | Peretz | G06Q 30/08 |
| | | | | 705/14.71 |
| 8,438,184 | B1 | 5/2013 | Wang et al. | 707/780 |
| 8,554,602 | B1 | 10/2013 | Zohar et al. | 705/7.33 |

(Continued)

OTHER PUBLICATIONS

To Match or Not to Match: Economics of Cookie Matching in Online Advertising, Ghosh et al., ACM Transactions on Economics and Computation, vol. 3, No. 2, Article 12, Publication date: Apr. 2015.*

(Continued)

*Primary Examiner* — David J Stoltenberg
(74) *Attorney, Agent, or Firm* — Slayden Grubert Beard PLLC

(57) ABSTRACT

A method for automated control of bid pricing for bidding on online placements in an automated real-time online auction system during the loading or rendering of network-based digital content. Historical bid result data regarding a particular placement is collected by a bidding system, which segments the bid result data into multiple categories and generates multiple pricing curves for the particular placement based on the segmented bid result data. The bidding system then uses the multiple pricing curves for making bidding decisions in real-time. The bidding system receives a series of bid requests, each identifying a placement in digital content being loaded or rendered. For each received bid request, the bidding system, in real-time, identifies segmenting characteristic(s) associated with the bid request, and performs a bidding analysis—including whether to submit a bid and determining a bid price—based on the identified segmenting characteristic(s) associated with the bid request.

2 Claims, 12 Drawing Sheets

(56) References Cited

U.S. PATENT DOCUMENTS

| | | | |
|---|---|---|---|
| 8,799,062 B1 | 8/2014 | Epperson et al. | 705/14.1 |
| 9,064,269 B1* | 6/2015 | Lei | G06Q 30/0241 |
| 9,767,488 B1* | 9/2017 | Wang | G06Q 30/0275 |
| 2002/0116313 A1* | 8/2002 | Detering | G06Q 30/0247 |
| | | | 705/37 |
| 2002/0147570 A1* | 10/2002 | Kraft | G06Q 30/02 |
| | | | 702/186 |
| 2003/0110171 A1 | 6/2003 | Ozer et al. | |
| 2003/0149937 A1 | 8/2003 | Mcelfresh et al. | 715/210 |
| 2003/0195832 A1 | 10/2003 | Cao et al. | 705/37 |
| 2006/0106710 A1 | 5/2006 | Meek et al. | 705/37 |
| 2006/0212350 A1 | 9/2006 | Ellis et al. | 705/14.41 |
| 2007/0143171 A1* | 6/2007 | Boyd | G06Q 30/0278 |
| | | | 705/306 |
| 2007/0174114 A1 | 7/2007 | Bigby et al. | 705/14.52 |
| 2007/0299682 A1* | 12/2007 | Roth | G06Q 30/02 |
| | | | 705/1.1 |
| 2008/0052195 A1* | 2/2008 | Roth | G06Q 30/02 |
| | | | 705/14.69 |
| 2008/0059361 A1* | 3/2008 | Roth | G06Q 30/02 |
| | | | 705/37 |
| 2008/0059362 A1* | 3/2008 | Roth | G06Q 30/02 |
| | | | 705/37 |
| 2008/0103898 A1 | 5/2008 | Flake et al. | 705/14.41 |
| 2008/0243824 A1 | 10/2008 | Riise et al. | |
| 2008/0249832 A1 | 10/2008 | Richardson et al. | 705/14.46 |
| 2009/0132348 A1* | 5/2009 | Bria | G06F 17/30572 |
| | | | 705/35 |
| 2010/0138271 A1 | 6/2010 | Henkin et al. | 705/14.54 |
| 2010/0198679 A1 | 8/2010 | Kassakian et al. | 705/14.42 |
| 2010/0228636 A1 | 9/2010 | Silverman et al. | 705/14.72 |
| 2010/0228642 A1* | 9/2010 | Baker | G06Q 30/02 |
| | | | 705/26.1 |
| 2010/0250332 A1 | 9/2010 | Ghosh et al. | 705/14.41 |
| 2010/0250362 A1 | 9/2010 | Bax et al. | 705/14.43 |
| 2010/0262455 A1 | 10/2010 | Karlsson et al. | 705/14.45 |
| 2010/0262497 A1 | 10/2010 | Karlsson | 705/14.71 |
| 2010/0317420 A1 | 12/2010 | Hoffberg | 463/1 |
| 2010/0324974 A1 | 12/2010 | D'ambrosio et al. | 705/310 |
| 2011/0015988 A1 | 1/2011 | Wright et al. | 705/14.42 |
| 2011/0035276 A1 | 2/2011 | Ghosh et al. | 705/14.46 |
| 2011/0040613 A1 | 2/2011 | Simmons et al. | 705/14.42 |
| 2011/0040635 A1 | 2/2011 | Simmons et al. | 705/14.71 |
| 2011/0040636 A1* | 2/2011 | Simmons | G06Q 30/02 |
| | | | 705/14.71 |
| 2011/0112923 A1* | 5/2011 | Chatter | G06Q 30/0206 |
| | | | 705/26.3 |
| 2011/0153449 A1 | 6/2011 | Hite | 705/26.3 |
| 2011/0166942 A1 | 7/2011 | Vassilvitskii et al. | 705/14.71 |
| 2011/0173126 A1 | 7/2011 | Knapp et al. | 705/71 |
| 2011/0178840 A1 | 7/2011 | Ravichandran | 705/7.29 |
| 2011/0191169 A1 | 8/2011 | Cui et al. | 705/14.46 |
| 2011/0191170 A1 | 8/2011 | Zhang et al. | 705/14.46 |
| 2011/0196733 A1 | 8/2011 | Li et al. | 705/14.42 |
| 2011/0196747 A1 | 8/2011 | Karidi et al. | 705/14.71 |
| 2011/0218955 A1 | 9/2011 | Tang et al. | 706/52 |
| 2011/0231253 A1* | 9/2011 | Crawford | G06Q 30/02 |
| | | | 705/14.49 |
| 2011/0231264 A1* | 9/2011 | Dilling | G06Q 30/02 |
| | | | 705/14.71 |
| 2011/0246297 A1* | 10/2011 | Buchalter | G06Q 30/02 |
| | | | 705/14.53 |
| 2011/0258036 A1 | 10/2011 | Ioffe et al. | 705/14.43 |
| 2011/0258041 A1 | 10/2011 | Ioffe et al. | 705/14.46 |
| 2011/0258056 A1 | 10/2011 | Ioffe et al. | 705/14.73 |
| 2011/0276392 A1 | 11/2011 | Vaver et al. | 705/14.43 |
| 2011/0313851 A1 | 12/2011 | Athey et al. | 705/14.46 |
| 2012/0030034 A1 | 2/2012 | Knapp et al. | 705/14.71 |
| 2012/0041816 A1 | 2/2012 | Buchalter | 705/14.41 |
| 2012/0053991 A1 | 3/2012 | Shimizu et al. | 705/7.34 |
| 2012/0066066 A1 | 3/2012 | Jain et al. | 705/14.48 |
| 2012/0089455 A1 | 4/2012 | Belani et al. | 705/14.44 |
| 2012/0150626 A1 | 6/2012 | Zhang et al. | 705/14.42 |
| 2012/0158456 A1 | 6/2012 | Wang et al. | 705/7.31 |
| 2012/0158490 A1 | 6/2012 | Neumeyer et al. | 705/14.46 |
| 2012/0221409 A1 | 8/2012 | Grebeck et al. | 705/14.46 |
| 2012/0245990 A1 | 9/2012 | Agarwal | 705/14.25 |
| 2012/0253928 A1* | 10/2012 | Jackson | G06Q 30/02 |
| | | | 705/14.49 |
| 2012/0310729 A1 | 12/2012 | Dalto et al. | 705/14.43 |
| 2012/0323674 A1 | 12/2012 | Simmons et al. | 705/14.41 |
| 2013/0018722 A1* | 1/2013 | Libby | G06Q 30/0241 |
| | | | 705/14.46 |
| 2013/0055309 A1* | 2/2013 | Dittus | H04N 21/2668 |
| | | | 725/35 |
| 2013/0066725 A1 | 3/2013 | Umeda | 705/14.66 |
| 2013/0097028 A1* | 4/2013 | Han | G06Q 30/02 |
| | | | 705/14.71 |
| 2013/0198011 A1 | 8/2013 | Corner et al. | 705/14.71 |
| 2013/0268374 A1 | 10/2013 | Papineni et al. | 705/14.71 |
| 2013/0346218 A1 | 12/2013 | Liu et al. | 705/14.71 |
| 2014/0006170 A1* | 1/2014 | Collette | G06Q 30/0277 |
| | | | 705/14.71 |
| 2014/0032306 A1 | 1/2014 | Sukornyk et al. | 705/14.43 |
| 2014/0040015 A1 | 2/2014 | Haley et al. | 705/14.45 |
| 2014/0046777 A1* | 2/2014 | Markey | G06Q 30/0269 |
| | | | 705/14.66 |
| 2014/0089106 A1* | 3/2014 | Jordan | G06Q 30/0202 |
| | | | 705/14.71 |
| 2014/0095324 A1* | 4/2014 | Cabral | G06Q 30/08 |
| | | | 705/14.71 |
| 2014/0100944 A1* | 4/2014 | Zhu | G06Q 30/0275 |
| | | | 705/14.41 |
| 2014/0120864 A1* | 5/2014 | Manolarakis | H04W 24/08 |
| | | | 455/405 |
| 2014/0229273 A1* | 8/2014 | Garcia-Martinez | |
| | | | G06Q 30/0275 |
| | | | 705/14.46 |
| 2014/0244403 A1* | 8/2014 | Asano | G06Q 30/0275 |
| | | | 705/14.71 |
| 2015/0193811 A1* | 7/2015 | Lei | G06Q 30/0242 |
| | | | 705/14.41 |
| 2015/0193815 A1* | 7/2015 | Juda | G06Q 30/0244 |
| | | | 705/14.43 |
| 2015/0302465 A1* | 10/2015 | Pieper | G06Q 30/0244 |
| | | | 705/14.43 |
| 2015/0363820 A1* | 12/2015 | Leitersdorf | G06Q 10/04 |
| | | | 705/14.41 |
| 2016/0162955 A1 | 6/2016 | O'kelley et al. | 705/14.71 |

OTHER PUBLICATIONS

Lo, Andrew et al., "Econometric Models of Limit-Order Executions," Masschussetts Institute of Technology, 59 pages, Mar. 22, 2000.

Chen, Ye et al., "Real-Time Bidding Algorithms for Performance-Based Display Ad Allocation," Association for Computing Machinery, 9 pages, Aug. 21, 2011.

United States Final Office Action, U.S. Appl. No. 13/831,252, 50 pages, dated Nov. 9, 2015.

Athey, Susan et al., "Nonparametric Approaches to Auctions," 125 pages, May 6, 2005.

United States Final Office Action, U.S. Appl. No. 13/857,123, 33 pages, dated Jan. 20, 2016.

United States Non-Final Office Action, U.S. Appl. No. 13/857,123, 17 pages, dated Jul. 13, 2015.

Perlich, Claudia et al., "Bid Optimizing and Inventory Scoring in Targeted Online Advertising," Media6Degrees, 9 pages, Aug. 12, 2012.

United States Non-Final Office Action, U.S. Appl. No. 13/672,698, 16 pages, dated May 27, 2014.

United States Final Office Action, U.S. Appl. No. 13/672,698, 10 pages, dated Nov. 7, 2014.

United States Non-Final Office Action, U.S. Appl. No. 13/831,252, 25 pages, dated Apr. 27, 2015.

United States Non-Final Office Action, U.S. Appl. No. 13/831,307, 32 pages, dated May 12, 2015.

Schnedler, Wendelin, "Likelihood Estimation of Censored Random Vectors," Alfred-Weber-Institut, Heidelberg University, Dept. of Economics, 25 pages, Apr. 11, 2005.

(56) References Cited

OTHER PUBLICATIONS

Debruyne, M. et at, "Censored Depth Quantiles," Computational Statistics & Data Analysis, vol. 52, pp. 1604-1614, May 13, 2007.
Wu, Wush Chi-Hsuan et al., "Predicting Winning Price in Real Time Bidding with Censored Data," Association for Computing Machinery, KDD'15, 10 pages, Aug. 10, 2015.
United States Non-Final Office Action, U.S. Appl. No. 13/831,252, 63 pages, dated Feb. 9, 2017.
U.S. Notice of Allowance, U.S. Appl. No. 13/857,123, 14 pages, dated Mar. 28, 2017.
U.S. Notice of Allowance, U.S. Appl. No. 13/831,252, 14 pages, dated Mar. 13, 2018.
U.S. Non-Final Office Action, U.S. Appl. No. 14/825,749, 30 pages, dated Feb. 12, 2018.
U.S. Non-Final Office Action, U.S. Appl. No. 13/831,252, 48 pages, dated Aug. 23, 2017.

\* cited by examiner

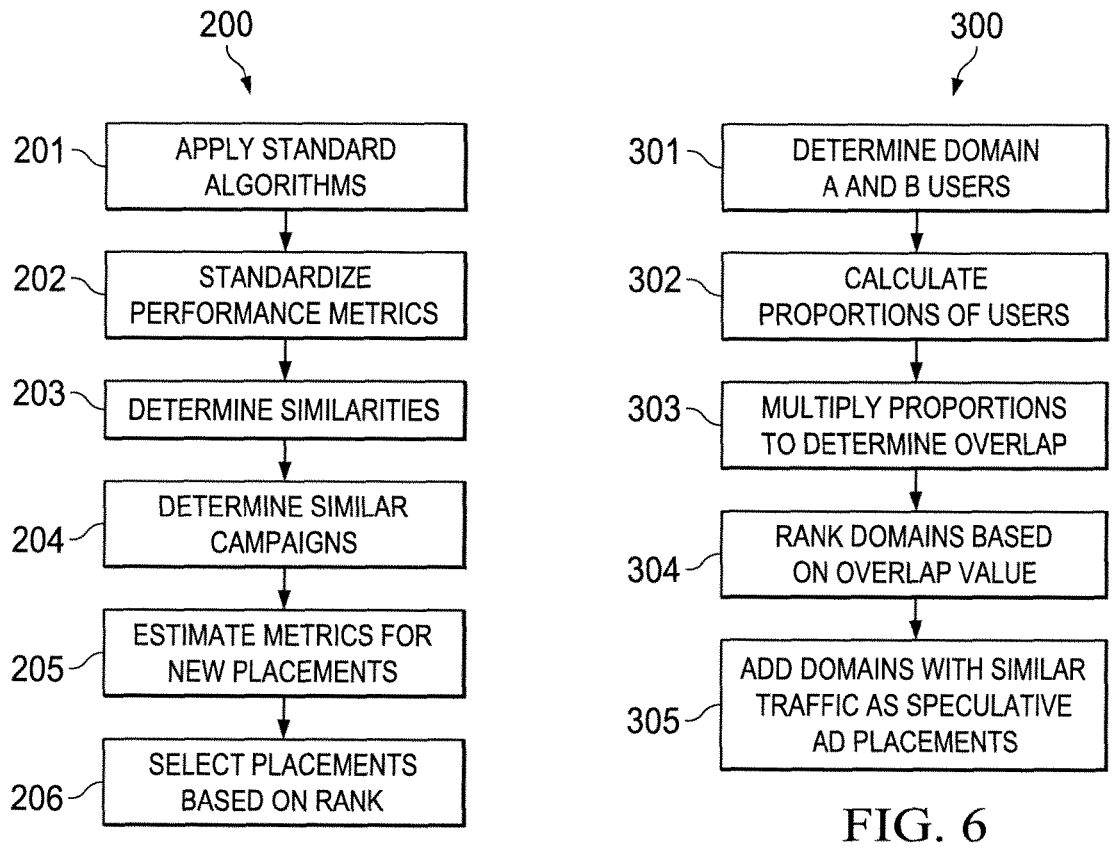
FIG. 5
FIG. 6
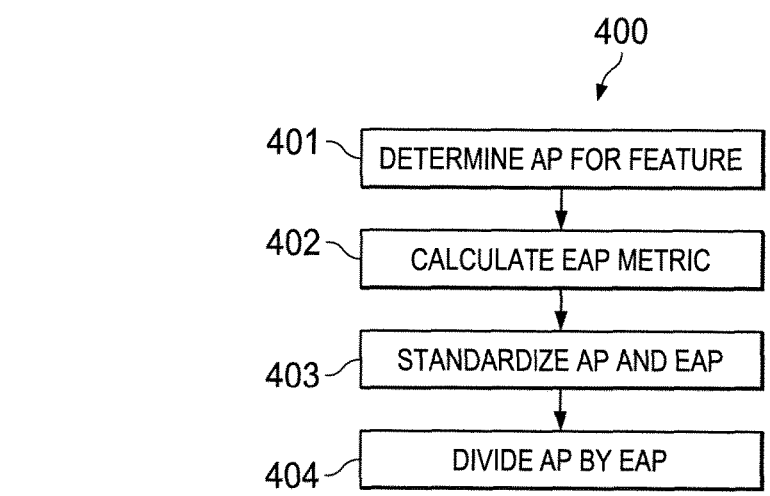
FIG. 7

FIG. 17

PRICING CONTROL IN A REAL-TIME NETWORK-BASED BIDDING ENVIRONMENT

RELATED APPLICATIONS

This application is a continuation-in-part of U.S. application Ser. No. 13/857,123 filed on Apr. 4, 2013, which claims the benefit of U.S. provisional application No. 61/621,379 filed on Apr. 6, 2012, the entire contents of which applications are herein incorporated by reference.

TECHNICAL FIELD

The present disclosure relates in general to the field of computer software and systems, and in particular, to systems and methods for providing automated control of bid pricing in a real-time online auction system during the loading or rendering of network-based digital content BACKGROUND Online advertisement placements generally refer to the slots or space on the pages of a website that are available for displaying advertisements along with their content. Advertisers typically bid on these advertisement placements that are made available through real-time bidding (RTB) exchanges such as AdX, Admeld, Pubmatic, etc.

From a mechanical perspective, online advertisement placement requires a bidding server connected to RTB exchanges. The bidding server then receives bid requests via the RTB exchanges. A bid request occurs when a user/Internet surfer visits a website or publisher that is selling their advertisement space on an RTB exchange. Upon receiving a bid request, the bidding server has a very short period of time to respond to this request (e.g., under 50 ms). Since this bid response needs to occur in a very short period of time, it is difficult to run large scale models to predict what advertisements to buy and what price to pay for them.

At bid time, the bidding server has to act on some set of rules, models or system instructions that indicate which bid requests it should bid or pass on. This is a non-trivial problem since there are numerous (e.g., billions) requests that could be bought at any given time, those requests are very different and occur randomly throughout the day, and each request needs to be evaluated in milliseconds.

Traditionally, an advertiser manually made simple static rules to be carried out at bid time. The advertiser observes and determines which internet domains were available on the exchanges. The advertiser selects the domains to bid on by entering them into a spreadsheet. Then, after some time (e.g., several days), the advertiser receives a report that indicates the click-through-rate ("CTR") for each domain, which refers to the percentage of times users click on a displayed advertisement (wherein each instance of the displayed advertisement is referred to as an "impression"). Based on the CTR for each domain, the advertiser may remove poorly performing domains and add new domains. This traditional approach is largely a process of trial and error that relied to a great extent on human memory and human judgment in an effort to meet desired CTR goals and to ensure enough domains are selected for the respective campaign to meet a periodic impression quota. Therefore, this traditional approach is prone to human errors. Furthermore, because domains are traditionally bid on using a static bid price, advertisers often pay too much for advertisement placements or fail to win valuable bids for the campaign.

SUMMARY

Methods and systems for controlling a pace of purchasing online advertisements in a real-time bidding (RTB) environment are disclosed.

One embodiment provides a method for automated control of bid pricing for bidding on online placements in an automated real-time online auction system during the loading or rendering of network-based digital content. A bidding system collects bid result data for a plurality of bids submitted by the bidding system for a particular placement, the bid result data indicating (a) whether each submitted bid for the particular placement was successful and (b) for each successful bid, an actual sale price for the particular placement as determined by a respective RTB exchange. The bidding system automatically segments the bid result data into multiple categories based on one or more segmenting characteristics associated with each of the plurality of bids submitted by the bidding system, and automatically generates multiple pricing curves for the particular placement based on the segmented bid result data. The bidding system receives, via a communications network, a series of bid requests generated by a real-time bidding exchange during the execution of a campaign, each received bid request identifying a respective placement in digital content being loaded or rendered by an internet-connected device. For each received bid request, the bidding system, in real-time during the loading or rendering of the respective digital content, identifies one or more segmenting characteristics associated with the bid request, and based at least on the one or more identified segmenting characteristics associated with the bid request, performs a bidding analysis including determining whether to submit a bid, and if it is determined to submit a bid, determining a bid price for the bid. If the bidding system determines to submit a bid, the bidding system submits the bid, including the determined bid price, to a respective real-time online bidding exchange.

Another embodiment provides a method for automated control of bid pricing for bidding on online placements in an automated real-time online auction system during the loading or rendering of network-based digital content. A bidding system receives, via a communications network, a series of bid requests generated by a real-time bidding exchange during the execution of a campaign, each received bid request identifying a respective placement in digital content being loaded or rendered by an internet-connected device. For each received bid request, the bidding system, in real-time during the loading or rendering of the respective digital content, determines whether to submit a bid, and if so, determines a bid price for the bid and submits the bid to a respective real-time online bidding exchange. At least one of (a) the determination of whether submit a bid or (b) the determination of the bid price is determined based at least on a dynamically updated pricing curve corresponding to the placement identified in the bid request. During the campaign, the bidding system collects bid result data indicating (a) whether each bid submitted by the bidding system was successful and (b) for each successful bid submitted by the bidding system, an actual sale price determined by the respective RTB exchange. The bidding system automatically executes a pricing curve adjustment algorithm for at least one placement to automatically adjust the pricing curves corresponding each of such placements, during the execution of the campaign, based at least on the bid result data collected by the bidding system during the execution of the campaign, and automatically implements the automatically adjusted pricing curves during the execution of the campaign; and Other embodiments provides a bidding system for automated control of bid pricing for bidding on online placements in an automated real-time online auction system during the loading or rendering of network-based digital content. The bidding system includes at least one processor, and computer-readable instructions stored in non-transitory computer readable medium and executable by the at least one processor to perform any of the methods disclosed above.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 5 is a flow-chart that illustrates an exemplary collaborative filtering process for selecting advertisement placements, according to one embodiment;

FIG. 6 is a flow-chart that illustrates an advertisement placement selection process based on similar user traffic, according to one embodiment;

FIG. 7 is a flow-chart that illustrates an exemplary process for feature comparison for advertisement size categories, according to one embodiment;

FIG. 17 illustrates an example of an advertisement placement, according to one embodiment.

Figure 1:
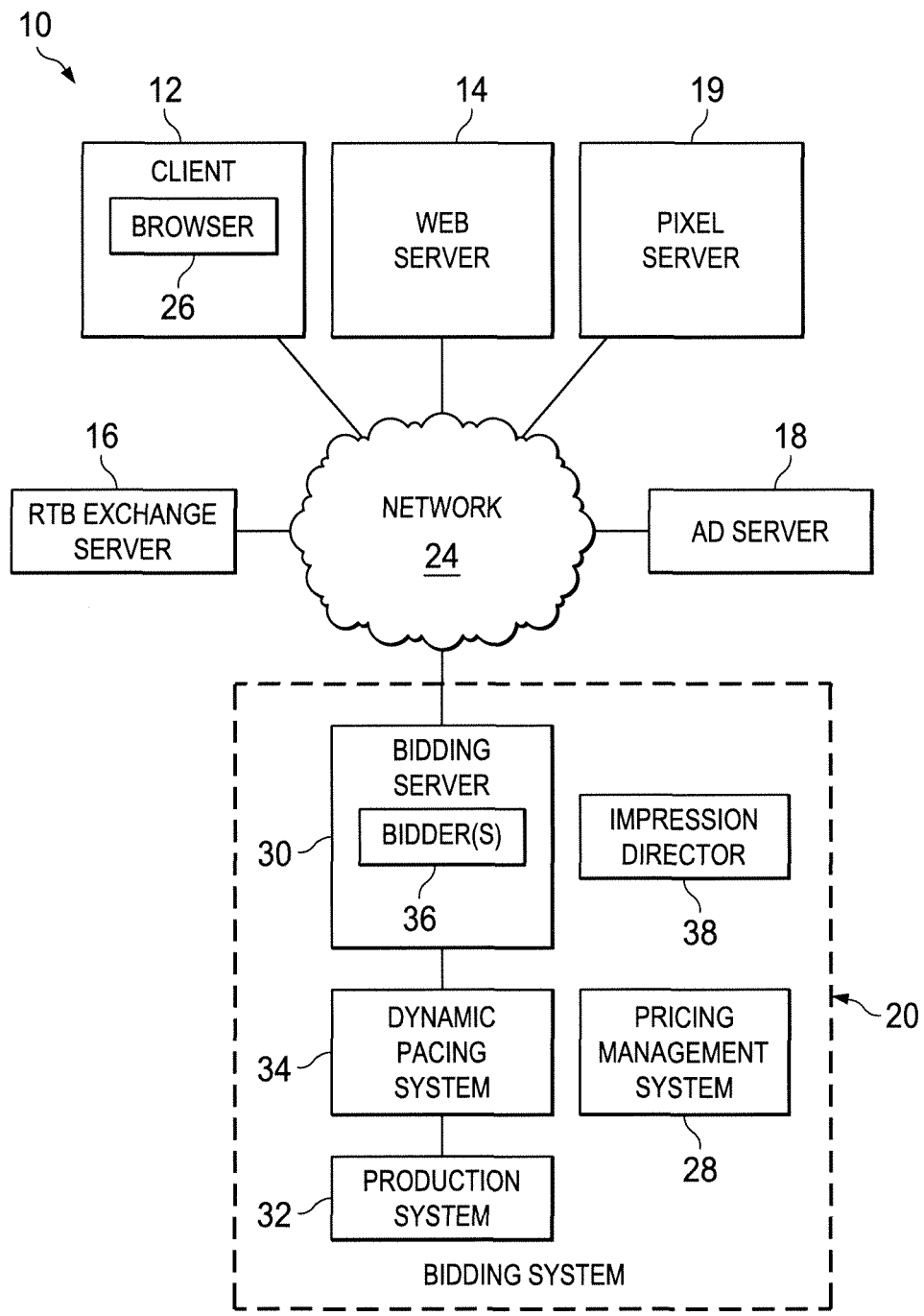
FIG. 1 illustrates an example system level architecture for an real-time bidding online advertising system, according to various embodiments.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Systems and methods are provided for automated control of bid pricing for bidding on online placements in an automated real-time online auction system during the loading or rendering of network-based digital content. Historical bid result data regarding a particular placement is collected by a bidding system, which segments the bid result data into multiple categories and generates multiple pricing curves for the particular placement based on the segmented bid result data. The bidding system then uses the multiple pricing curves for making bidding decisions in real-time. The bidding system receives a series of bid requests from RTB exchange(s), each bid request identifying a placement in digital content being loaded or rendered by an internet-connected device. For each received bid request, the bidding system, in real-time during the loading or rendering of the digital content, identifies segmenting characteristic(s) associated with the bid request, and performs a bidding analysis—including whether to submit a bid and determining a bid price—based on the identified segmenting characteristic(s) associated with the bid request.

Systems and methods are also provided for automated adjustment of pricing curves used for making bidding decisions, e.g., wherein such adjustment is performed during the execution of an online advertising campaign. For example, a bidding system may execute a pricing curve adjustment algorithm to automatically adjust a pricing curve based on bid result data collected during the execution of the campaign, which bid result data may indicate whether bids placed by the bidding system were successful, and if so, the actual sale price for each winning bid.

Other embodiments provide a bidding system for executing the methods discussed above. The bidding system may include at least one processor and computer-readable instructions stored in non-transitory computer readable medium and executable by the at least one processor to perform the methods disclosed above.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or processes presented herein are not inherently related to any particular computer or other apparatus. Various general purpose systems, computer servers, or personal computers may be used with programs in accordance with the teachings herein, or it may prove convenient to construct a more specialized apparatus to perform the method steps. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure. It is also expressly noted that the dimensions and the shapes of the components shown in the figures are designed to help to understand how the present teachings are practiced, but not intended to limit the dimensions and the shapes shown in the examples.

FIG. 1 illustrates an example system level architecture for a system 10 for controlled purchasing of online advertisements in a real-time bidding (RTB) environment, according to one embodiment. System 10 may include a plurality of clients 12, web servers 14, an RTB exchange system 16, one or more advertisement servers (ad servers) 18 hosting a variety of advertisement content, one or more pixel tag servers 19 (in some embodiments), and one or more bidding systems 20, all connected via a network 24. Each client 12 may host a browser 26 configured to view webpages hosted by web servers 14 via network 24. When a user at a client 12 clicks a link or otherwise opens a webpage, the web server 14 hosting the webpage sends data to RTB exchange system 16 indicating details of each ad placement on the requested page. RTB exchange system 16 then generates a real-time bid request for each ad placement on the requested page and sends each bid request to each bidding system 20 in the system 10. Thus, because each bid request relates to an ad placement for an instance of a page load, each bid request relates to a particular ad placement.

In some embodiments, advertisements may be delivered to clients other than traditional web browsers. In these embodiments, web server 14 may be more precisely described as a content server providing content to a client for ultimate delivery to a user. Served content may include hypertext formatted data (e.g., hypertext markup language (HTML)) or data in other formats such as in the Extensible Markup Language (XML). Served content may include multimedia content including data representing images, graphics, sounds, music, spoken language, video, animations, etc. Served content may include visual or audible content and may or may not include written or spoken language. In some embodiments, client 12 may be a mobile device such as a handheld device (e.g., a smart phone or tablet), a wearable device (e.g., a smart watch, smart glasses, or a connected earpiece), or a vehicle-embedded device such as an in-dash or in-seat entertainment or navigation system. Browser 26 may be a software program capable of converting served content into a human-perceptible presentation. For example, browser 26 may convert XML and audio data received from web server 14 into an audio stream to be output to an in-dash stereo system or an ear piece. In this example, the data received from web server 14 may include a sequence of music streams arranged in a personalized "radio" station. In order to pay for the streaming service, the service provider (e.g., the operator of web server 14) may inject audio advertisements into the stream and may allow real-time bidding for the audio advertisement slots. In this example, the data received by browser 26 from web server 14 may include advertisement tags, each of which causes browser 26 to request an advertisement through the RTB system. An advertisement served by ad server 18 may be an audio file or audio stream to be played in sequence with other audio programming.

In another example, browser 26 may convert HTML and image data received from web server 14 into a visual advertisement embedded within an app running on a smartphone. In this example, HTML data received from web server 15 may include advertisement tags, each of which causes browser 26 to request an advertisement through the RTB system similar to a traditional web browser. In some embodiments, an app running on a smartphone may directly generate an ad request to ad server 18 and retrieve advertisement content from ad server 18. In certain of these embodiments, the app operates as browser 16 and web server 14.

In yet another example, browser 16 may convert XML and graphics data received from web server 14 into sequences of animations displayed on a smart watch. In this example, the XML data may include an ad tag that causes browser 16 to request an advertisement through the RTB system and to download advertisement content from ad server 18. The smart watch then displays the advertisement content for some interval on the watch.

Thus, it should be understood that references herein to loading a webpage, or more particularly, actions performing during the loading of a webpage, are intended to apply similarly to loading or rendering of any form or type of digital content by any type of internet-connected device.

In another embodiment, when a user at client 12 opens the webpage, the webserver 14 hosting the web page serves the webpage to client 12 and includes within that webpage one or more ad tags. Each ad tag is a uniform resource locator (URL) that instructs the web browser of client 12 to load content from RTB exchange server 16. The ad tag may include data indicating details of an ad placement on the requested page. RTB exchange system 16 then generates a real-time bid request for the ad placement on the requested page and sends the bid request to each bidding system 20 in the system 10. RTB exchange server 16 then responds to the ad tag request with web content containing a redirection command (e.g., a HTTP 302 response code) that includes a URL for the ad content selected by the winning bidder. Client 12 interprets the redirection command and requests ad content using the provided URL. This ad content may be, for example, text, an image, streaming content, or some mix of web content.

Each bidding system 20 is configured to analyze each incoming bid request and determine whether to bid on the respective placement/impression, and if so, a corresponding bid price.

RTB exchange system 16 may then determine a winning bid for each bid request, e.g., by comparing the respective prices of bid requests received from multiple different bidding systems 20, and inform the winning bidding system 20 identified in the winning bid. The winning bidding system 20 may then select an appropriate advertisement to be served to the client 12, and impression director 18 may direct the respective ad server 18 hosting the selected advertisement to serve the selected advertisement, such that the advertisement is served in the respective placement (which was identified in the bid request) of the webpage being loaded by the client's web browser 26.

Each bidding system 20 may include any suitable components and utilize any suitable models or algorithms to make bidding determinations for incoming bid requests from RTB exchange server 16. In some embodiments, bidding system 20 may be configured to generate a target delivery plan for purchasing/serving ad impressions for a particular ad campaign, and a pacing system for managing the rate of purchasing impressions over time.

In the example embodiment shown in FIG. 1, a bidding system 20 includes a bidding server 30, a production system 32, a dynamic pacing system 34, an impression director 38, and a pricing management system 28, each of which includes any suitable hardware, software, and/or firmware for performing the respective functions of the bidding system 20. Bidding system 20 may include any number of instances of each component, e.g., multiple bidding servers 30. Further, the various components of bidding system 20 may be located at a common physical location, or may be geographically distributed and communicatively connected by network 24 or other network(s).

Bidding server 30 may include one more bidders 36 that include processing resources and computer code (e.g., software) stored in memory and executable to score incoming bid requests and make real-time bidding determinations based on rules and data supplied by production system 32 and dynamic pacing system 34, and generate and send bid responses to RTB exchange system 16 indicating a decision to bid or pass on each bid request (or alternatively may respond only to bid requests it wishes to bid on) and a corresponding bid price.

Production system 32 may be configured to generate and provide a list of rules to the bidding server 30, which uses the rules to score each incoming bid request. Production system 32 may also be configured to generate and provide a delivery plan to dynamic pacing system 34, which dynamically calculate a pacing threshold value based on the delivery plan. Dynamic pacing system 34 provides the dynamically calculated pacing threshold value to bidding server 30, which compares the bid request score for each incoming bid request against the current pacing threshold value to determine whether to bid on the bid request and, in some embodiments, a bid price.

Production system 32 may store or have access to parameters for an ad campaign (or multiple simultaneously-running ad campaigns), such as a campaign setup, target metrics (goals), and requirements, and may be configured to generate a delivery plan for purchasing and serving ad impressions for a defined lifetime of the campaign, or some other duration. The delivery plan may define different impression purchase quotas or targets for a given period of time, e.g., a month, a week, a day, an hour, a minute, or any combination of such time periods. In some embodiments, the delivery plan may specify a target delivery profile (i.e., target delivery profile) that defines a target rate of impressions purchased (target purchase rate) over time for a defined time period, which rate may be static or dynamic over the defined time period. For example, the target delivery profile may define a time-based curve of a dynamic target purchase rate over time, which curve may be generated based on known time-based dynamic information, such as a dynamic internet activity curve, a dynamic traffic curve for a particular website, a dynamic online traffic curve for users in a particular geographic region, or any other suitable data.

Impression director 38 comprises a server configured to direct ad servers 18, which may be owned by third parties distinct from bidding system 20, to serve advertisements upon notification of winning bids by RTB exchange 16. In some embodiments, each bid submitted by bidding server 30 includes a pointer (URL) to the impression director server 38. When a bid submitted by bidding system 20 wins the respective action at RTB exchange 16, the exchange 16 notifies the impression director 38 via the pointer (URL), and the impression director 38 then identifies and directs the appropriate ad server 18 to serve the appropriate ad. Impression director 18 may collect and store data regarding the ads (impressions) served over time, which data may be supplied as feedback to bidding system 20 for influencing subsequent decisions of bidding system 20. For example, in some embodiments, impression director 18 may count the number ads (impressions) served over time, which may be used as feedback for influencing the pacing of impression purchasing.

Pricing management system 28 is configured to manage pricing curves, e.g., win probability-sale price curves and bid-price curves—for various advertisement placements. For example, pricing management system 28 may automatically generate pricing curves, dynamically adjust pricing curves over time, analyze pricing curves to select bid prices for bids on advertisement placements, determine whether to segment and/or combine pricing curves, and provide any other generation, control, or management functions related to pricing curves. In some embodiments, pricing management system 28 provides a partial or fully automated closed-loop control of pricing curves, e.g., an automated closed-loop adjustment of a pricing curve implemented for a campaign based on bid result data collected during the execution of the campaign.

System 10 typically benefits a web publisher (i.e., a person or business providing content on web server 14) by allowing a vast number of advertisers to bid for the right to display ads along the publisher's content. The competition among advertisers may offer web publishers greater ad revenue and/or lower costs to obtain ad revenue compared to a scenario where a web publisher has to contract with individual advertisers. System 10 also benefits advertisers by allowing access to a vast number of web publishers.

Technical Challenges Presented by "Real-Time" Bidding Protocols

RTB Exchanges 16 typically implement a protocol that requires that the bidding process for each ad placement of a loading webpage be completed within a time period of a small fraction of a second, e.g., within 80, 100, or 120 milliseconds, i.e., a period of time that is generally less than the 100-400 milliseconds it takes to blink one's eyes. One goal of a "real-time" bidding process is to keep bid response times (and thus web page load times) fast enough to keep the user's attention. Research into user behavior has shown that users expect web pages to load quickly and will abandon a website if load times are too long. For example, one 2009 study concluded that consumers expect a load time of no more than two seconds, which is twice as fast as the expected load time reported by a similar study conducted in 2006.

The real-time bidding process, which typically must be completed within a small fraction of a second as discussed above, is an extremely complex process involving numerous network-based communications between different entities and execution of numerous, often very complex, processing and decision-making algorithms. For example, real-time bidding process typically involves, upon selection (e.g., by a user) of a webpage for loading, generation of a bid request for each ad placement included in the webpage, sending the bid request for each placement from a real-time bidding exchange to a plurality of bidding systems, each bidding system analyzing each bid request and executing various bidding algorithms to determine whether to bid on each bid request, as well as determining a bid price for each bid, and sending the bids back to the exchange, and the exchange receiving the bids from the bidding systems, selecting a winning bid for each ad placement, and sending out notifications of the winning bids. This entire process is completed within the fraction of a second as defined by the relevant RTB protocol, and repeated for every page load of any webpage having ad placements specified for real-time bidding.

Thus, with reference to the system shown in FIG. 1, bidding system 20 must respond to each bid request received from an RTB exchange server 16 in a fraction of the time the RTB exchange server 16 is allotted for responding to an ad request. This processing time allotted to bidding system 20 may be 10 milliseconds, 20 milliseconds, or up to 100 milliseconds in some cases. In some systems, the RTB exchange server 16 may select a winning bid as soon as it has received a threshold number of bids, rather than holding the auction open for a preset time. In such systems, a bidding system 20 with a bid response time of 20 milliseconds may have a measurable competitive advantage over another bidding system 20 that could only respond to a bid in 40 milliseconds.

Thus, based on the above, the real-time bidding process presents enormous technical challenges that are unique to the real-time bidding environment, e.g., as compared with conventional advertising techniques and even previous online advertisement protocols. For example, prior to the advent of real-time bidding for online advertisements, an advertiser would typically purchase blocks of ad impressions (e.g., in increments of 1,000) from selected web sites, which web sites would then serve the purchased ads over a specified period of time. This previous process did not involve anywhere near the level of technical complexity or extremely fast "real-time" processing required by the real-time bidding systems discussed herein. Thus, the real-time bidding process for online advertisements introduces unique technical challenges that did not previously exist. In addition, as RTB bidding systems become more complex, e.g., by attempting to target particular customers or websites having particular content, the required algorithms and processing resources become even more challenging and complex.

As used herein, the term "real-time" in the context of "real-time bidding" refers to a bidding processing for ad placements in a webpage that occurs during the loading of the webpage, and in some bidding systems is further defined by a specified time period for completion of the bidding process (e.g., 100 ms) during the loading of the page. In other contexts (e.g., with respect to the determination and/or adjustment of a pacing threshold value for controlling the rate of purchasing impressions), the term "real-time" means (a) according to a defined time schedule of operations (e.g., as specified by a relevant external or internal protocol) and/or (b) in an ongoing manner during the ongoing execution of a related process (e.g., a related process that uses that output of the relevant "real-time" process as input) or during the ongoing execution of the respective ad campaign, as would be understood by one of ordinary skill in the art in view of the relevant context of each respective use of the term.

Figure 2A:
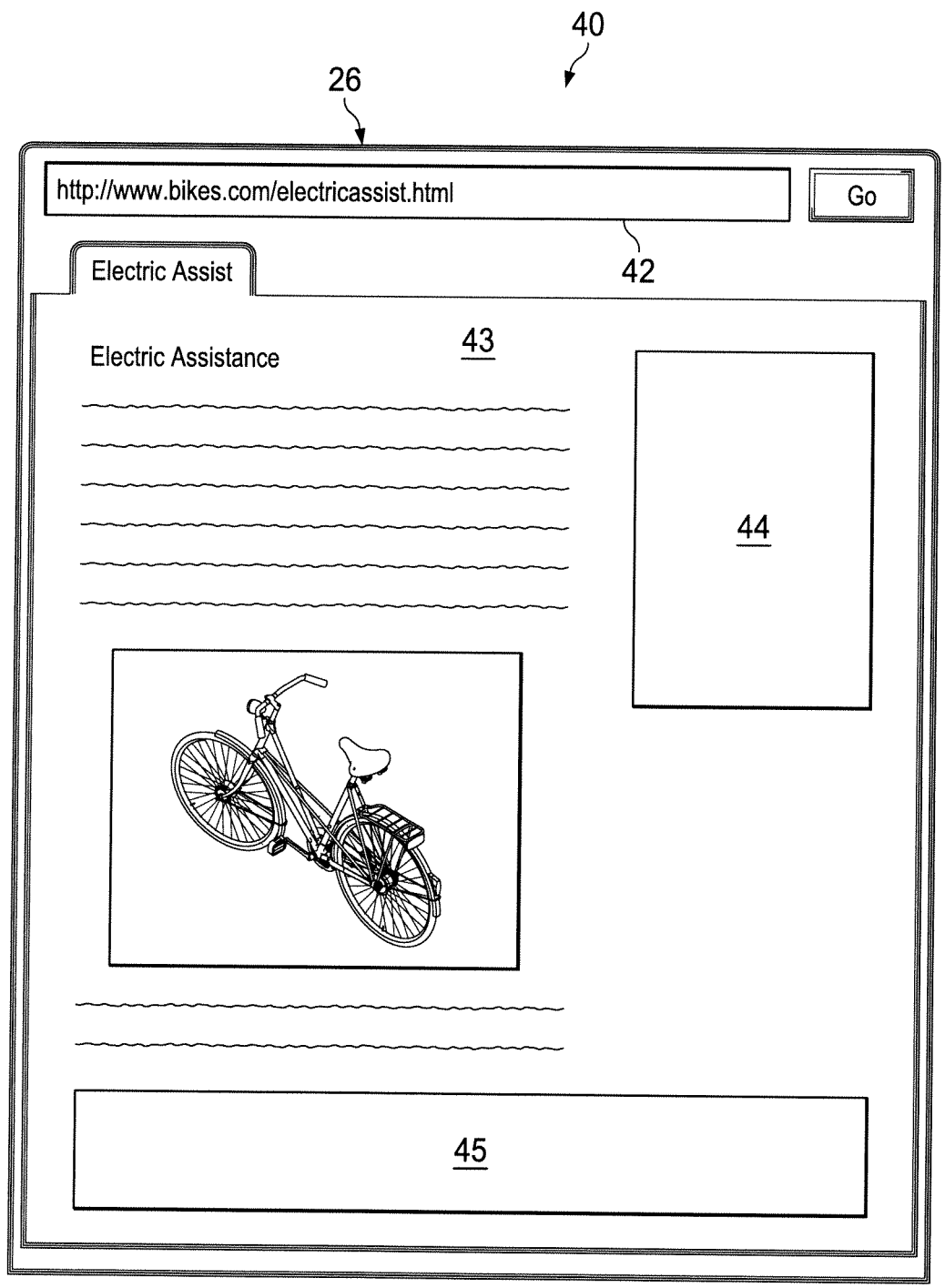
FIG. 2A illustrates an example snapshot of a web browser display, according to one embodiment.

FIG. 2A illustrates an example snapshot 40 of web browser 26 showing the display at client 12 of system 10, according to one embodiment. Snapshot 40 comprises URL address bar 42 and web content 43. Snapshot 40 illustrates a partially rendered web page showing content retrieved by client 12 from web servers 14 via network 24 but shows unpopulated ad placement locations 44 and 45. In some embodiments, ad placements may be rendered before or at least partially simultaneously with the remaining content in the web page; however, this illustration shows the primary web content rendered first to illustrate the ad placement locations. Web content 43 as shown in snapshot 40 is an article about electric assistance systems to aid bicycle riders on long rides or up hills.

Figure 2B:
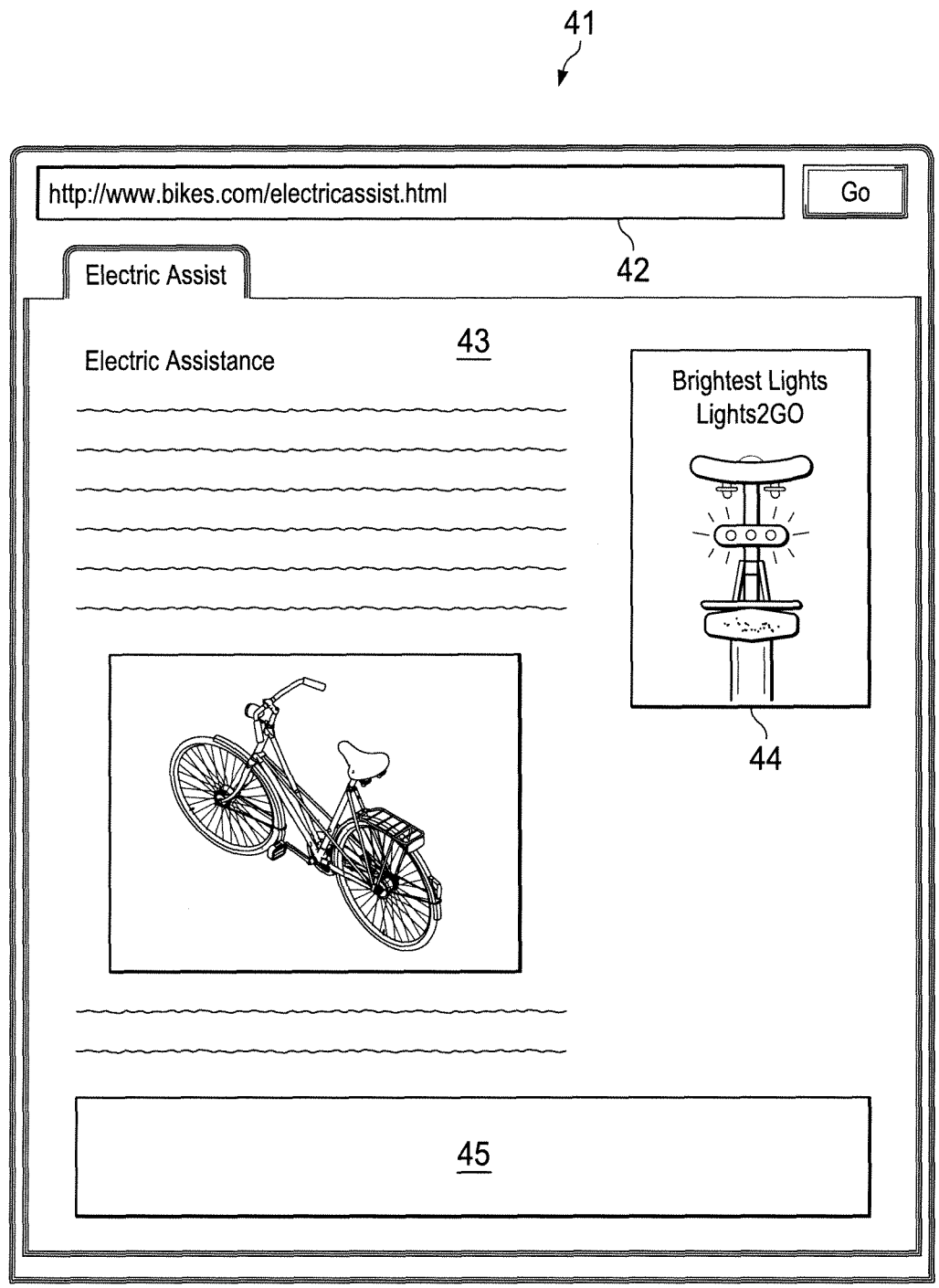
FIG. 2B illustrates another example snapshot of a web browser display, according to one embodiment.

FIG. 2B illustrates an example snapshot 41 of web browser 26 showing the display at client 12 of system 10, according to one embodiment. Snapshot 41 comprises URL address bar 42 and web content 43. Snapshot 40 illustrates a partially rendered web page showing content retrieved by client 12 from web servers 14 via network 24, populated ad placement location 44, and unpopulated ad placement location 45. Ad placement location 44 is shown populated with ad content received from, for example, a particular ad server 18 corresponding to the winning bid selected by RTB exchange system 16. In snapshot 41, ad placement location 44 is populated with an advertisement for bicycle lights, while web browser 26 may be loading an advertisement for a political campaign to be rendered in ad placement 45.

Figure 3:
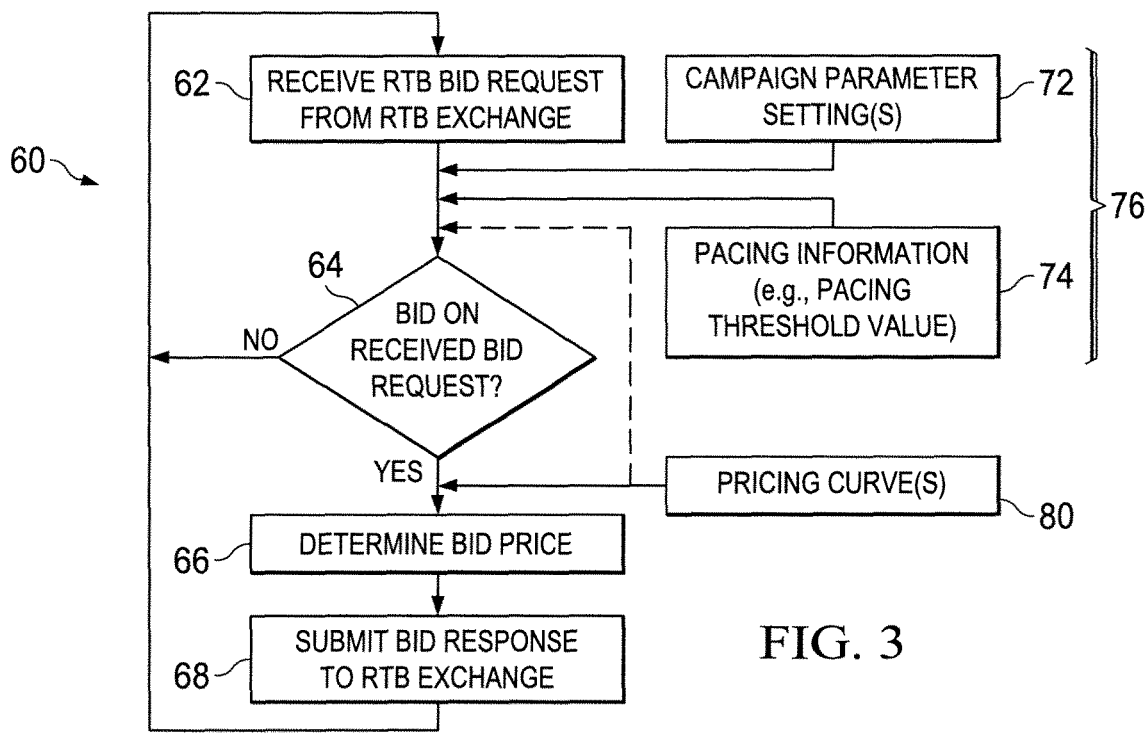
FIG. 3 illustrates a flowchart for an example method of executing an online advertisement campaign in a real-time bidding (RTB) system, according to one embodiment.

FIG. 3 illustrates a flowchart for an example method 60 of executing an online advertisement campaign in an RTB system, according to one embodiment. At step 62, bidding system 20 receives a real-time bid request from RTB exchange system 16 for an ad placement in a webpage being loaded via a client browser 26. At step 64, bidding system 20 determines, in real-time, whether or not to bid on the bid request based on (a) information in the bid request and (b) one or more parameters 76 associated with the campaign known to and/or managed by bidding system 20. In some embodiments, bidding system 20 may also use one or more pricing curves 80, e.g., a win probability curve corresponding with each respective bid request, as input for determining whether to bid on each incoming bid request. Bidding system 20 may make such bidding determinations using any suitable algorithm(s).

The bid request information in the incoming bid request may identify the URL of the webpage being loaded, details regarding the ad placement, information regarding the end-user device loading the webpage (e.g., IP address and/or other identifying information), a cookie, and/or any other types of information. The parameters 76 associated with the campaign, which are analyzed in connection with the bid request information for making the bidding determination, may include (a) one or more campaign parameter settings, indicated at 72, (b) pacing information for controlling the pace of impression purchasing through the duration of the campaign, indicated at 74, and/or any other types of information relevant to making bidding decisions for the campaign.

If bidding system 20 determines to bid on the bid request, bidding system 20 determines a bid price based on any relevant data and using any suitable algorithm(s) at step 66, and submits a bid response (indicating the bidder and the bid price) to the respective RTB exchange 16, all within the predefined time limit (e.g., 100 ms) from the time the RTB exchange 16 sent out the bid request to the time the RTB request receives the bid response from bidding system 20. For example, bidding system 20 may determine a bid price for each respective bid based on one or more pricing curves corresponding to the bid request, e.g., a win probability-sale price curve and/or a bid-price curve corresponding to the placement identified in the bid request and/or other parameters associated with the bid request. In some embodiments or situations, bidding system 20 may utilize one or more pricing curves that correspond to the domain identified in the respective bid request. In other embodiments or situations, e.g., as discussed in detail below, bidding system 20 may employ more specific or granular pricing curves that are specific to one or more characteristics related to the bid request, e.g., the specific web page within the domain, the time of the bid request, the geographic location of the end user associated with the bid request, whether or not the end user has cookies enabled/available, other characteristic(s) of the end user, and/or any other characteristics related to the bid request.

The method then returns to step 62 for the next incoming bid request. Bidding system 20 may include multiple bidders 36 to simultaneously process multiple incoming bid requests.

Defining Advertisement Placements

Typically, the number of unique advertisement requests that are found in an RTB is in the order of billions. In an effort to efficiently manage the massive amount of information on RTB exchanges, it is advantageous to create a structure to classify the billions of unique advertisement placements into fewer, optimizable components.

Figure 17:
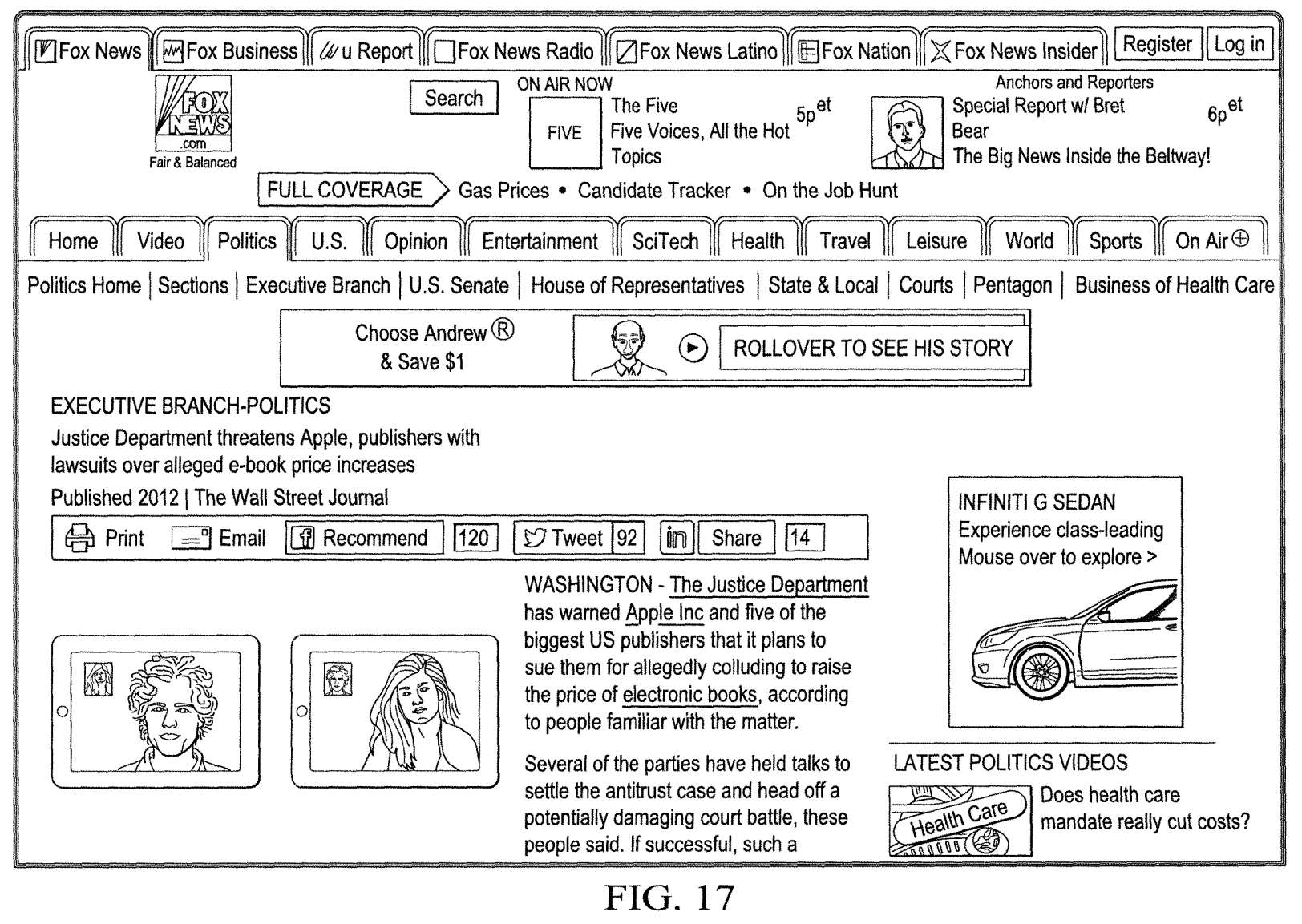

According to one embodiment, advertisement placements may be grouped by segments. For instance, an advertisement placement may be defined using the following structure: {RTB exchange, Domain, Segment1, Segment2, . . . , SegmentN, Ad Size, Ad position}. To illustrate, consider the advertisement placement shown in FIG. 17 for the web address http://www.foxnews.com/politics/2012/03/07/justice-department-threatens-apple-publishers-with-lawsuits-over-alleged-e-book/. Applying this structure, the advertisement placement may be defined as follows:

Exchange: AdX
Domain: foxnews.com
Segment1: politics
Segment2: 2012
Segment3: 03
Segment4: 07
Segment5: justice-department-threatens-apple-publishers-with-lawsuits-over-alleged-e-book
Ad Size: 728×90
Ad Position: Above the fold Grouping advertisement placements into different advertisement segments allows probabilistic statements to be made because probabilistic statements require a sample. Observing and evaluating individual URLs as placements by themselves does not allow easily for statements regarding what works according to any metric. By grouping URLs together into advertisement placements, useful statistical inferences are made.

Statistically, the rarer an event, a larger sample size is needed to be able to accurately measure its efficacy. Campaign goals (metrics) are rare events that vary greatly. An advertisement placement should be defined in such a way that the sample size is sufficiently large to make probabilistic statements. For instance, consider CTR goals for display and video advertisements. Because clicks are a much rarer event on display advertisements than they are on video advertisements (e.g., 0.1% vs 2% CTRs on average), the above advertisement placement may be defined more broadly for a display campaign:
   Exchange: AdX
   Domain: foxnews.com
   Ad Size: 728×90
   Ad Position: Above the fold
While for a video campaign, the above advertisement placement may be defined more narrowly:
Exchange: AdX
Domain: foxnews.com
Segment1: politics
Segment2: 2012
Ad Size: video ad
Ad Position: Above the fold Thus, defining an advertisement placement may include the number of impressions that have been served on the placement, and how rare are the occurrences of the event that is being optimized. Generally, the more information that is available for an advertisement placement or the more common the occurrences of an event are, the more granularly the advertisement placement may be defined. Advertisement placements may be defined or redefined on the fly for every campaign and every performance metric.

The end result is a dynamic dataset that evolves as advertisements are served. This dataset is unique and dynamically changes every time the data is processed. The present system and method groups URLs into placements as granularly as it can, while still retaining sufficient information for inference. The granularity depends on:
   the efficacy of the placement; the higher the success rate, the fewer impressions are needed for inference, and/or
   the similarity of the placement; if the placement performs on par with those around it, then it does not get broken out into a separate placement. Those placements that perform above or below the expectation get broken into different placements.

Placement Recommendation

After defining the advertisement placement set for each campaign, the next step is to rank all the advertisement placements for each campaign given the knowledge of all placement performance across all known campaigns including previous and on-going campaigns.

Figure 4:
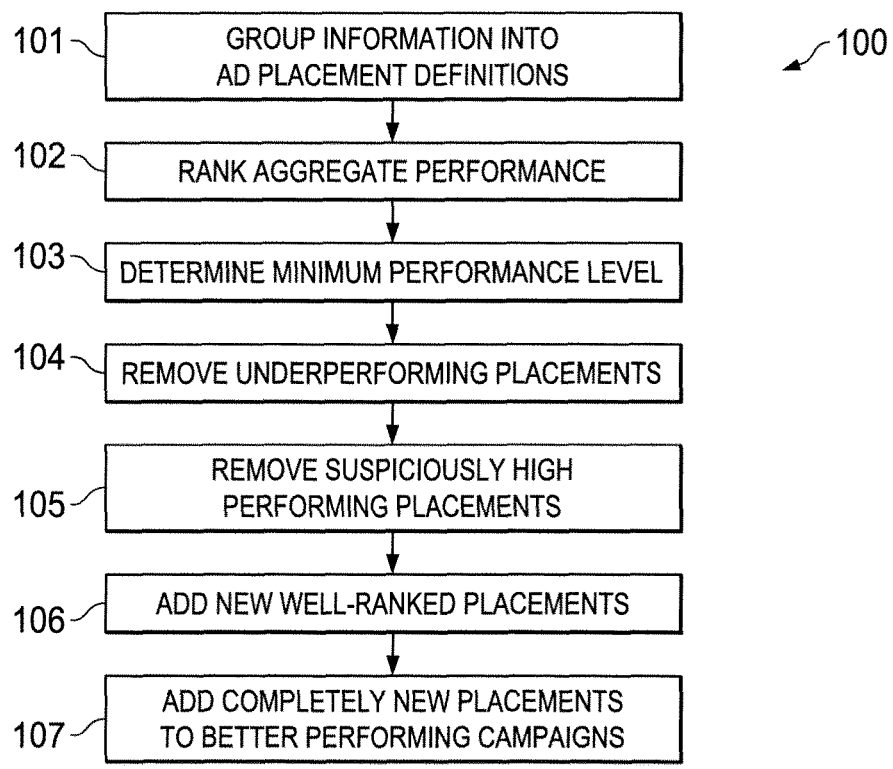
FIG. 4 is a flow-chart that illustrates a process for selecting advertisement placements based on popularity, according to one embodiment.

FIG. 4 is a flow-chart that illustrates a method 100 for selecting advertisement placements based on popularity, according to one embodiment. Starting at 101, impression and various other forms of information from all known campaigns are grouped together into advertisement placement definitions. Other forms of information may, for instance, include cross campaign placement comparisons that reveal whether certain advertisement sizes are more effective than others. It may also include domain categories that are used to manipulate rankings and to help the system learn whether some content categories consistently outperform others.

The advertisement placements are then ranked based on their aggregate performance across all the previous campaigns. At 102, all advertisement placements served within each campaign are ranked. At 103, minimum and maximum desired performance levels for the advertisement placements for each on-going or currently-active campaign are determined. Thus, each campaign is associated with its own minimum and maximum levels. At 104, advertisement placements from each on-going campaign that do not meet a minimum performance level are removed. At 105, advertisement placements that have suspiciously high performance metrics are also removed as they may be indicative of non-human activity, such as those performed by spiders/crawlers that generate fake clicks. At 106, new advertisement placements are added to each on-going campaign based on their aggregate performance rank (determined at 101). At 107, some proportion of placements that are completely new to the system (e.g., no performance information from previous campaigns) may be added to the better performing, on-going campaigns. This allows the learning of performance information regarding speculative advertisement placements.

In addition to the selection process illustrated in FIG. 4, each campaign may be associated with specified "white lists" or "black lists" that may affect the ranking of advertisement placements. A white list may refer to a list of domains that are adequate for advertisement placements. This could be a list from a client, an internal list, or a list based on domain categories. A black list may refer to a list of sites that are excluded from the server because they that have deemed undesirable for a campaign. These lists may be applied to all optimizations.

While the process of FIG. 4 selects advertisement placements based on their performance/popularity, a collaborative filtering process is also contemplated (this is not restricted to collaborative filtering, any matrix factorization or other recommendation technique is implied throughout the document where "collaborative filtering" is used). FIG. 5 is a flow-chart that illustrates an exemplary collaborative filtering process 200 for selecting advertisement placements, according to one embodiment. Starting at 201, the performance of each advertisement placement is determined based on standard user-based recommendation (e.g., each campaign is treated as a user and each advertisement placement is treated as an item). At 202, the performance metrics are standardized for each campaign. At 203, Pearson (or other) similarity measures may be used to determine which campaigns are similar based on how they performed on like placements with like performance metrics. At 204, for each campaign, a number of other campaigns (e.g., 10) that are most similar to it are determined. Then, at 205, performance metrics for new placements may be estimated based on a weighted average of how similar campaigns performed on those placements. The weights may be based on how similar the other campaign is to the campaign of interest and how many impressions were served to each placement, and how certain the system is that the observed performance metric resembles the truth. Finally, at 206, the desired advertisement placements for a campaign may be selected based on their rank (e.g., based on weighted scores of observed performance or from performance scores of similar campaigns for each placement) and estimated performance metrics.

In addition to the selection processes of FIGS. 1 and 2, it may also be desirable to select advertisement placements that are similar to top rated advertisement placements through similar user traffic. FIG. 6 is a flow-chart that illustrates an advertisement placement selection process 300 based on similar user traffic, according to one embodiment. Starting at 301, users which have visited domain A (e.g., domain with top rated advertisement placements) and users which have visited domain B are determined. At 302, the proportion of users that visited domain A that also visited domain B is calculated $$\left(\text{e.g.,} \frac{A \cap B}{B}\right).$$

Similarly, the proportion of users that visited domain B that also visited domain A is calculated $$\left(\text{e.g.,}\ \frac{A\cap B}{A}\right).$$

At 303, these two values are multiplied together to define a similarity measure that equals "1" if the audience for both domains is exactly the same and "0" if domains A and B have no overlapping users. Using this measure, at 304, all other domains are ranked by how similar they are in terms of users to the top performing domain for any campaign. At 305, domains with similar traffic to a top performing domain are added as speculative advertisement placements. These advertisement placements may be biased towards the low volume domains because generally they will have a more precise audience.

Although the processes illustrated by FIGS. 1-3 have been described independently, it is contemplated that they may be used in combination with one another, such as in a tiered system, to facilitate the selection of advertisement placements for campaigns. Another process that may be applied to further facilitate the selection of advertisement placements is feature comparison across advertisement sizes, domain categories (e.g., news, sport, entertainment, technology, etc.), and campaign categories (e.g., Auto, CPG, insurance, etc.).

FIG. 7 is a flow-chart that illustrates an exemplary process 400 for feature comparison for advertisement size categories, according to one embodiment. Starting at 401, the aggregate performance ("AP") of advertisement placements by advertisement size is determined for a given campaign. At 402, the expected aggregate performance ("EAP") for each advertisement size across all other campaigns is calculated. The expected aggregate performance provides a measure of how it should have performed. At 403, both the values AP and EAP, found in 401 and 402, respectively, are standardized so that they are directly comparable. Finally, at 404, by taking the standardized AP value and dividing by the standardized EAP value, the system measures the difference between the actual performance by advertisement size and the expected performance. For instance, a value of "1" indicates that it is performing as expected and a value of "1.2" indicates that the advertisement size is performing 20% better than expect. The advertisement size is sent in the bid request. It represents the size of the advertisement slot available on the given URL.

While the above process of FIG. 7 is illustrated with respect to advertisement size comparison, it can be applied across any feature set. The result may also be averaged across all feature sets, for instance, to an adjustment centered around "1." The results may further be averaged by placement and multiplied by the estimated rating from the user-based recommender model of FIG. 5 to get an updated score estimate.

One issue that may be associated with selecting advertisement placements is a cold start problem. This problem refers to the situation in which campaign performance information over several advertisement placements may be unavailable for making an accurate recommendation for advertisement placement. One method to resolve this issue is to use item popularity to create a starting list. Another method is to pick the top N placements from all campaigns to ensure a good mix of placements and allow a campaign to select the best neighborhood of similar campaigns as fast as possible. Additionally, feature information based on campaign category may also be included. For instance, if the new campaign is an insurance-based campaign, placements which worked best for other insurance-based campaigns may be determined. This may be accomplished using the same methods as described above without providing similarity data, but rather grouping campaigns or taking the top N placements out of a category. A mixture of these methods may be applied to help solve the cold start problem.

Digital Zip/User Targeting

Another aspect of the present system and method is grouping Internet Protocols (IPs) and IP ranges into clusters based on geographic location known as Digital Zips (DZs). This allows the optimization of DZs or IPs based on some performance metric, similar to how advertisement placements are optimized as described above. For instance, in the optimization of DZs or IPs, each DZ is treated as an item and each campaign as a user. This allows the system to use a similar user-based collaborative filtering approach described above. Furthermore, a similarity technique similar to the technique illustrated in FIG. 6 may be applied to find new DZs that are similar to good performing DZs based on traffic patterns.

Traditionally, advertisers target entire countries or large metropolitan areas. The present recommender system breaks these larger areas into much smaller neighborhoods for efficient targeting. The recommender system uses offline data such as census data, sales data and map the data to geographic areas to recommend good performing DZs or DZs that are expected to perform well for advertising.

As a campaign progresses, the recommender system receives performance feedback as to how DZs are performing. Performance feedback can be either sales or any online metrics such as click through rates. Performance feedback allows the recommender system to algorithmically learn and monitor the performance of geographic areas and when necessary to suggest stop advertising as well as making recommendations to new DZs to try for advertising.

DZ information can be layered and adjusted for spatial correlation using formal spatial models. When targeting areas to serve advertisements, a subset of available DZs may be chosen instead of all the available DZs. This allows the identification of DZs in the subset that perform well. Geographic neighbors to DZs that perform well are also more likely to perform well. Using standard spatial models, campaign performance may be estimated across the entire geographic space that are of interest for serving. Such standard spatial models include spatial Durbin model (SDM), spatial error model (SEM), spatial autoregressive model (SAR), conditional autoregressive model (CAR), and K-nearest neighbors methods. This way new DZs may be better selected, and poor performers may be thrown out. Such standard spatial models, for example, include spatial Durbin model (SDM), spatial error model (SEM), spatial autoregressive model, or the like.

This method can easily be combined with the user-based method. For example, performance correlations of each DZ may be estimated, standardized around "1," and then multiplied by the estimate score.

Price Optimization

Another aspect of the present system and method is price optimization. The RTB environment generally operates using a second price auction system. Advertisement placements have a clear price distribution around them and often have a price floor that moves over time. There is also a yearly price drift whereby placements increase in price over the year. There are also several cyclical components that occur within the year that affect all placements or some subset of placements (e.g. public holidays affect all placements while political events affect news and political placements only).

By looking at winning prices and win rates for placements that have been bid on, the present system estimates a price distribution that the market follows. The present system also estimates the price drift of this distribution over time.

Having estimated this distributional information, the system determines tradeoffs between lowering price and bid wins (impression volume). If the system observes that it is one of the highest bidders for an advertisement placement, then the system can lower its bid price substantially, lose marginal volume and have large decreases in the price paid. By doing this at scale across all placements, the system targets a desired win rate and given cost tailored to campaign volume, performance, and cost needs. The system determines tradeoffs between winning bid price and volume.

When there are lots of available impressions for a given placement, the system can strategically move down the price curve and maintain the same level of performance by effectively only buying the cheapest advertisements needed to meet the campaign's goals for that particular advertisement placement. Under some circumstances there are more advertisement placements available for purchase than required. Under these circumstances the present system strategically bids for the cheapest impressions within all advertisement placements, thus maintaining performance and impressions spread across the same number of placements. In this case, the system strategically buys the cheaper advertisements (at a lower price and thus lower win rate) while maintaining the performance.

In a given auction, there might be only one bidder. For all auctions, there is also an unknown and randomly changing price floor. Under these circumstances, the winning bid is set by the only bidder, and the present system exploits and targets placements by lowering the bid price until it reaches the current price floor. If it starts to lose all the time, it will raise price again. This applies when there is only one bidder in a given auction. Under some circumstances, the system can predict quite accurately when this is the case. When there is only one bidder, the system determines a bid price that reaches the cheapest win price (i.e., price floor). This holds performance and win rate constant while decreasing the cost significantly. If the cheapest win price is not known, a higher market price is chosen so as to determine the market curve.

Price Distribution Estimation for Advertisement Placements

Since a bidder in an RTB environment only sees a winning price if it is the highest bidder in an auction, from a statistics point of view, the bidder is operating in a right-censored data setting. A right-censored data setting occurs when the value of the winning price is above a certain price but unknown by how much. Specifically, if a bidder wins an auction, it observes the price it paid (i.e., a data point with full information that was drawn from the price distribution). On the other hand, if a bidder loses an auction, it knows that the highest bid was greater than its bid for that particular auction (i.e., a right-censored data point where the lower bound is a bidder's losing bid).

Suppose $T_i$ (i=1, 2, ..., n) are the highest bids among a bidder's competitors that are drawn independently and identically distributed from a price distribution F. Next, suppose that a bidder's bids $M_i$ are drawn independently and identically distributed from its own distribution G and that $T_i$ is censored on the right by $M_i$. In other words, the bidder observes a function:

$(Z_i; \delta_i)$ where $Z_i = \min(T_i, M_i)$ and $\delta_i = (T_i < M_i)$, and where $\delta_i$ denotes an indicator function that indicates whether an observation is fully observed or not. i.e., if $\delta_i=1$, $T_i$ is less than $M_i$, and an observation is fully observed; if $\delta_i=0$, $T_i$ is greater than $M_i$ and an observation is censored.

This situation fits into the field of survival analysis that involves a modelling of time to event data. For example, in medical studies, both the birth and death dates of a subject (e.g., patient) are known. In this case, complete data information data involving the subject may not be fully available prior to any analysis. For example, consider a medical study that measures the life expectancy of patients with cancer. In this study, some of the patients may die from an unrelated cause (e.g., car accident, and heart attack) and their exact date of death from the cancer is not known. It is only known that death would have occurred later than some point (i.e., a right-censoring data setting). Therefore, although survival analysis has traditionally been used in medical studies, this analysis is particularly relevant to an RTB environment where the right-censored environment is considered.

According to one embodiment, a bidder in an RTB environment is interested in inferring parameters of a price distribution that gives the probability F(t) of winning at some bid price t. Furthermore, using this price distribution, a bidder can derive the expected price that is conditional on winning, i.e., $E_F[T|T<t]$ which estimates the average price that a bidder pays per auction won at a bid price t, which function is referred to herein as a "bid-price curve." When this is translated into survival analysis, the bid price t is translated into a time t. F(t) provides the probability of a competitor's bid dying (i.e., do not win) before time t and $E_F[T|T<t]$ gives the average time of death for bids that died before time t.

The survival function S(t) that gives the probability Pr of a bid surviving until at least time t is represented by the equation:

$s(t) = Pr(T > t) = 1 - F(t)$, where T is the time of death.

The likelihood function L(θ) of an estimator on censored data is a typical formula known to one ordinary skilled in the art, and further includes the information given by the censored data. The likelihood function L(θ) provides a function of the distributional parameters for the price distribution. For right censored data, the likelihood function L(θ) is given by:

$$L(\theta) = \prod_{i=1}^{n} f^{\delta_i}(t_i) S^{1-\delta_i}(t_i) = \prod_{i=1}^{n} f^{\delta_i}(t_i)(1 - F(t_i))^{1-\delta_i}$$

If the actual date of death (uncensored death) for a bid is at time $t_i$, the time $t_i$ is known and its contribution to the likelihood function L(θ) is as usual: the density f at the time of death, i.e., $t_i$. On the other hand, if a bid's censored death occurred at time $t_i$, then under non-informative censoring, the actual date of death would have exceeded time $t_i$ which contributes a censored observation's contribution at time $t_i$ to $S(t_i)$ that forms part of the likelihood function L(θ).

Therefore, given (or assuming) a price distribution F and using the likelihood function L(θ), estimates of the distributional parameters of the price distribution are computed either analytically or through optimization. A price distribution curve is fitted to the price distribution based on the distributional parameters. The price distribution curve may follow a parametric price distribution, or a non-parametric price distribution (e.g., the Kaplan-Meier estimator).

Figure 8:
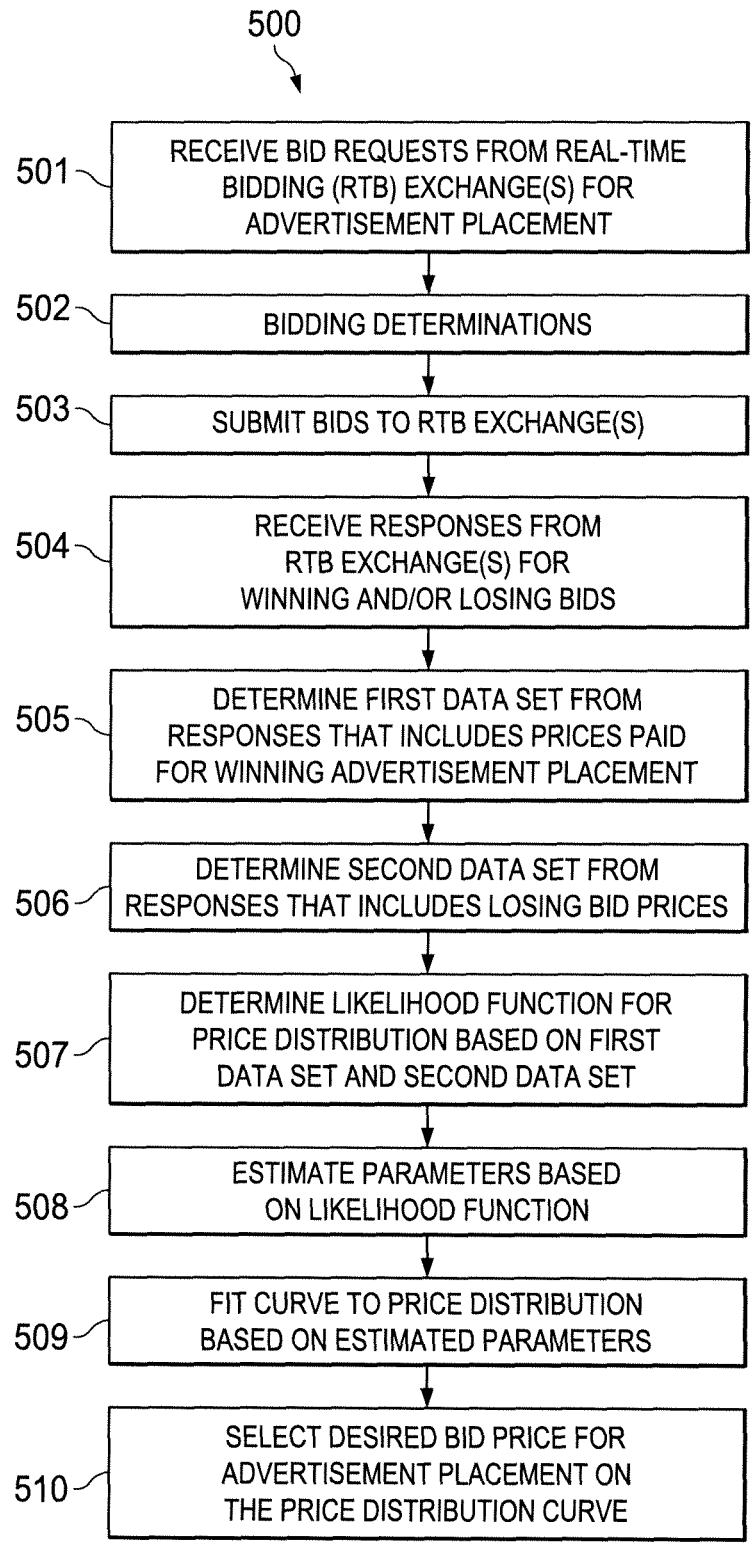
FIG. 8 illustrates a flow chart of an exemplary process for pricing an advertisement placement, according to one embodiment.

FIG. 8 illustrates a flow chart of an exemplary method 500 for analysing the pricing of a particular advertisement placement by a pricing management system 28 of a bidding system 20, according to one embodiment. REAt 501, the bidding system 20 receives a number of bid requests for the particular advertisement placement from one or more RTB exchanges 16 over time. At 502, bidding system 20 makes bidding decisions for each received bid request. For each received bid request, bidding system 20 determines in real-time (a) whether to submit a bid (also referred to herein as a bid response) for the particular advertisement placement identified in the bid request, and if so, (b) a price for the bid. In some embodiments, the determination of whether to submit a bid for a particular advertisement placement includes scoring the bid request (e.g., with respect to desirability for the relevant campaign) and comparing the bid score to the current value of a pacing threshold, which may be dynamically adjusted by dynamic pacing system 34 as discussed herein. If bidding system 20 determines to submit a bid, bidding system 20 may determine a price for the bid in any suitable manner, e.g., using a predefined static price for a campaign, or based on one or more relevant pricing curves for the particular advertisement placement, e.g., a win probability-sale price curve and/or a bid-price curve for the placement, which may be dynamically adjusted, e.g., as discussed herein. Bidding system 20 may then submit a bid, which specifies the bid price, to the respective RTB exchange from which the respective bid request was received, as indicated at 503.

At 504, for each submitted bid that is successful (i.e., wins the RTB auction for the placement), bidding system 20 receives an exchange response from the respective exchange 16 indicating the price paid for the winning bid, which in some systems (e.g., in a second price auction) will be equal to or lower than the bid price submitted by the bidding system 20. In some systems, bidding system 20 also receives an exchange response for failed bids, indicating that the bid was unsuccessful, but not the winning bid price. In other systems, bidding system 20 does not receive an exchange response for failed bids. At 505, pricing management system 28 generates a first data set from the exchange responses for winning bids submitted by bidding system 20 that indicates the prices paid for the winning bids. At 506, pricing management system 28 generates a second data set from the exchange responses for losing bids submitted by bidding system 20 that indicates the losing bid prices (alternatively, in a system in which bidding system 20 does not receive an exchange response for failed bids, pricing management system 28 generates a second data set from bids the received no exchange response). At 507, pricing management system 28 calculates a likelihood function for the price distribution of the placement based on the first data set and the second data set. The first data set and the second data set may contribute data points to the likelihood function. For example, the first data set may contribute uncensored data points to the likelihood function, while the second data set contribute right-censored data points of a survival function to the likelihood function. At 508, pricing management system 28 calculates parameters of the price distribution based on the likelihood function. At 509, pricing management system 28 fits a curve to the price distribution based on the parameters calculated at 508. At 510, pricing management system 28 calculates a desired bid price for the placement on the price distribution curve generated at 509, which may then be used by bidding system for subsequent bids on the placement.

Figure 9:
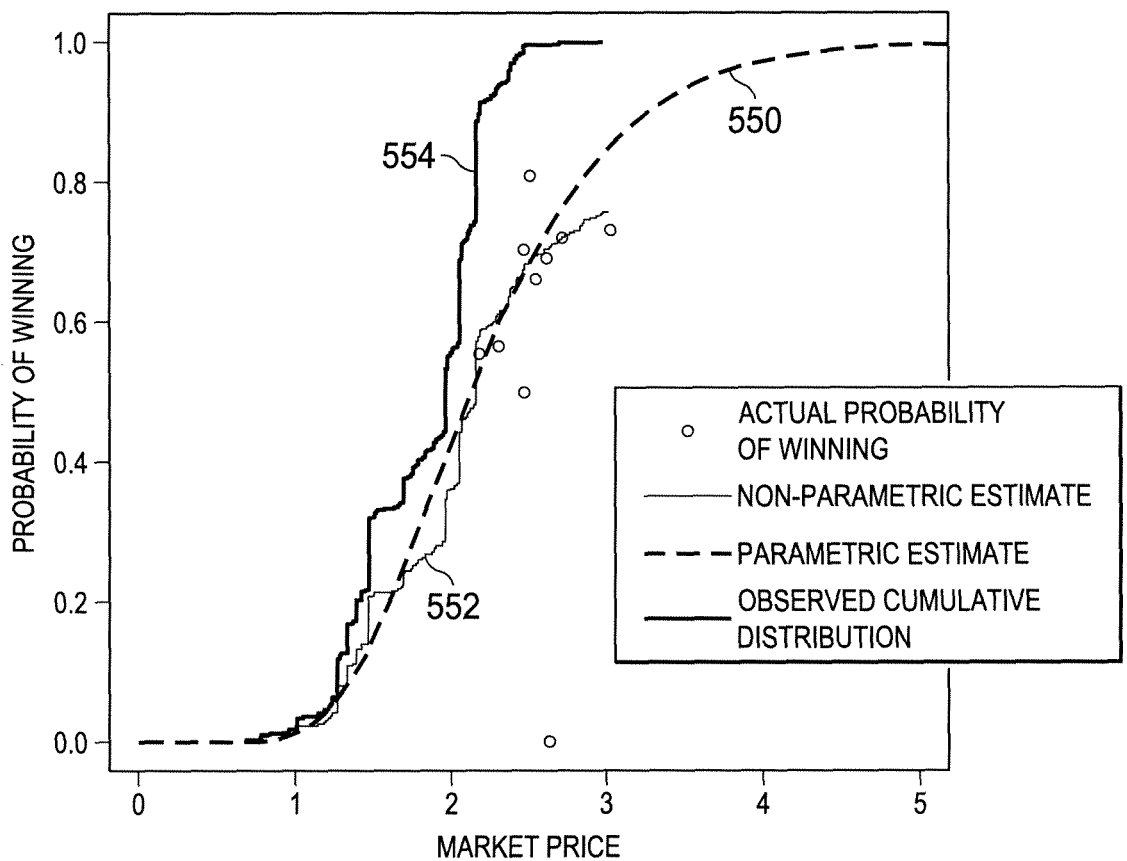
FIG. 9 illustrates a graph with exemplary price distribution curves, according to one embodiment.

FIG. 9 illustrates a graph showing example price distribution curves for a particular advertisement placement, according to one embodiment. Pricing management system 28 may generate a parametric estimate curve 550 and/or a non-parametric estimate curve 552 from an observed cumulative distribution 554, e.g., according to the techniques discussed above. Pricing management system 28 may then select a desired bid price for the advertisement placement as a price point lying on one of the generated (parametric or non-parametric estimate) price distribution curves.

In some embodiments, pricing management system 28 may generate one or more bid-price curves for each of a number of advertisement placements. As used herein, a "bid-price curve" indicates the average or expected price that a bidder will actually pay (sale price) upon a winning bid as a function of bid price. These expected sale price may differ from (e.g., be lower than) the offered bid price in systems in which the winning bidder may pay less than the bid price submitted by the winning bidder, e.g., in systems that employ a second price auction. In some embodiments, pricing management system 28 may be configured to generate a bid-price curve for a particular placement based on a win probability-sale price curve for that placement. As used herein, a "win probability-sale price curve" indicates the probability of winning a RTB auction for a placement as a function of bid price. Historical sale price data, rather than bid price data, may be used to generate the win probability-sale price curve in a second price auction system, because the sale price in each auction represents the bid price that would have won that auction, regardless of the actual bid price that won the auction.

Figure 10:
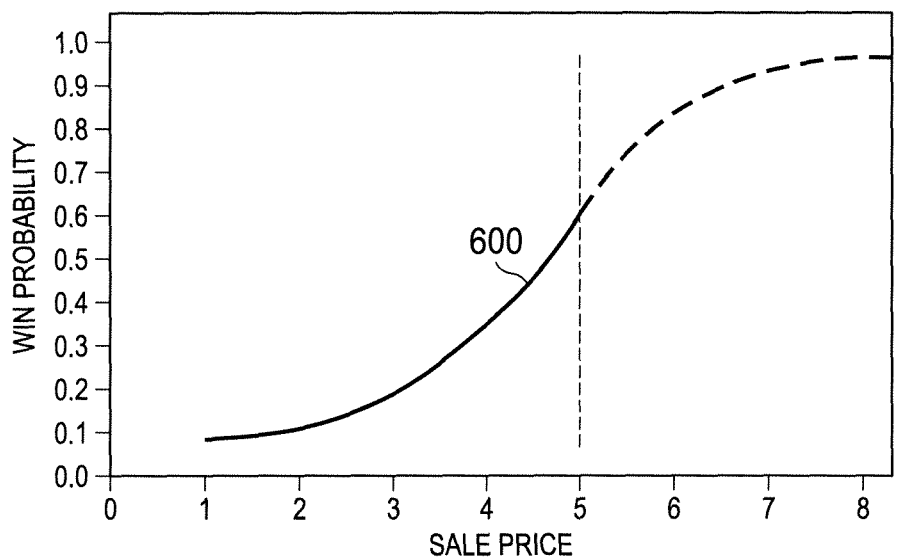
FIG. 10 illustrate an example win probability-sale price curve for a particular advertisement placement, according to one embodiment.

FIG. 10 shows an example win probability-sale price curve 600 generated by pricing management system 28 for a particular advertisement placement. The curve 600 indicates the probability of winning an auction for the placement as a function of actual sale price, and thus represents the win probability for a submitted bid price. Thus, win probability-sale price curve 600 indicates that a bid price of 2 provides a 10% chance of winning an auction for the particular placement, while a bid price of 5 provides a 60% chance of winning an auction for the placement. Pricing management system 28 may generate curve 600 based on collected data regarding bids placed by bidding system 20 for the placement, in any suitable manner. For example, system 28 may (a) submit a number of bids for the placement over time at a single bid price (e.g., a static bid price of 5), or alternatively, at multiple different bid prices, (b) collect the win/loss results and actual sale price of winning bids for such submitted bids, and (c) generate curve 600 based on such win/loss and sale price data. In this example, pricing management system 28 used a maximum bid price of 5, such that the curve based on collected data extends only up to the sale price of 5, as indicated by the solid line portion of curve 600. However, in some embodiments, pricing management system 28 may extrapolate curve 600 beyond the maximum bid level based on known historical curve characteristics, e.g., curve characteristics corresponding to survival functions, as discussed above. Thus, example curve 600 includes an extrapolated portion generated by pricing management system 28, as indicated by the dashed line portion of the curve.

Figure 11:
FIG. 11 illustrates an example bid-price curve generated based on the example win probability-sale price curve shown in FIG. 10, according to one embodiment.

FIG. 11 shows an example bid-price curve 610 generated by pricing management system 28 based on the example win probability-sale price curve 600 shown in FIG. 10, according to one embodiment. Pricing management system 28 may generate bid-price curve 610 based on win probability-sale price curve 600 using any suitable algorithm(s) and/or statistical techniques, e.g., as discussed herein (for example, in the "Price Distribution Estimation for Advertisement Placements" section), or in any other suitable manner.

In some embodiments or situations, pricing management system 28 may utilize a static win probability-sale price curve and/or a static bid-price curve for each placement over time, e.g., over the full duration of a campaign. In other embodiments or situations, pricing management system 28 may automatically and dynamically update the win probability-sale price curve and/or the bid-price curve for one or more placements over time (e.g., during the duration of a campaign), using a closed-loop control system or otherwise.

Figure 12:
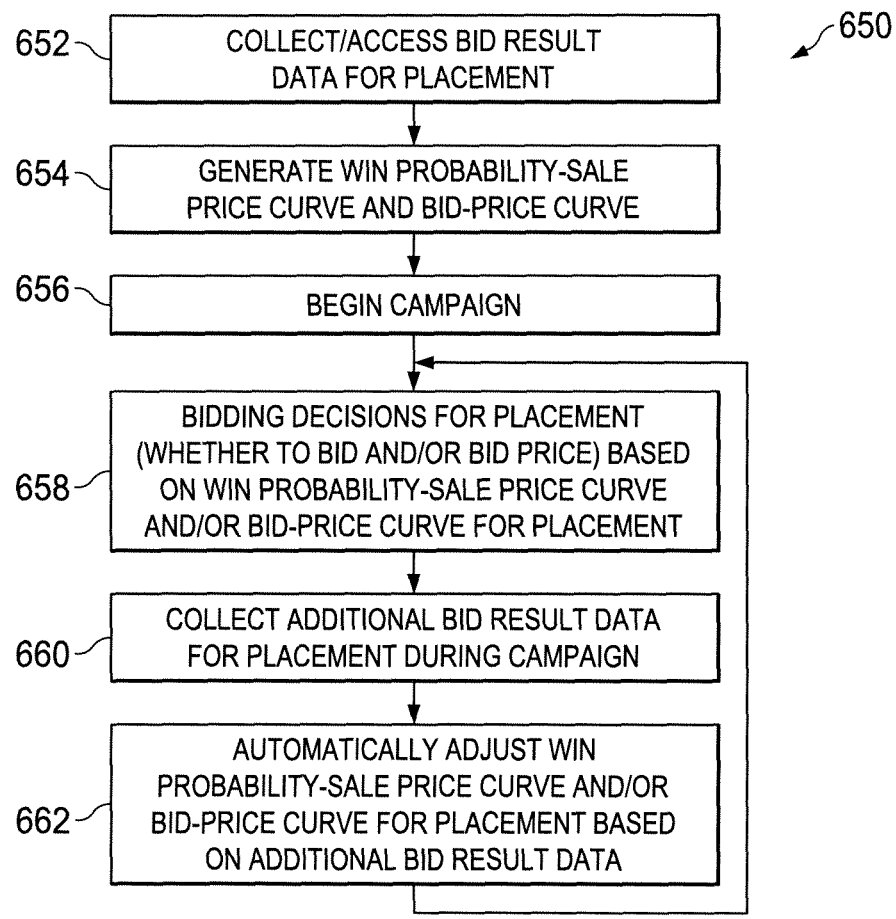
FIG. 12 illustrates a flowchart for an example method of automatically and dynamically adjusting bid prices for an online advertisement campaign in a real-time bidding (RTB) system, according to one embodiment.

FIG. 12 shows an example method 650 for closed-loop control of a win probability-sale price curve and bid-price curve for a particular placement targeted for a campaign, during the execution of the campaign, according to an example embodiment. At step 652, pricing management system 28 obtains bid result data, including win/loss results and actual sale price of winning bids for bids submitted for the particular placement. Such data may be obtained in any manner, e.g., collected over time by pricing management system 28 prior to the beginning of the campaign, or accessed from a third party, for example. At 654, pricing management system 28 may generate a win probability-sale price curve and bid-price curve for the placement based on the data obtained at step 652, e.g., based on the techniques discussed above. For example, in one embodiment, pricing management system 28 may generate a win probability-sale price curve for the placement, and then generate the bid-price curve for the placement based on the win probability-sale price curve, e.g., as discussed above.

At step 656, the campaign begins. At step 658, bidding system 20 makes bidding decisions for the particular placement based at least on the win probability-sale price curve and/or the bid-price curve for the particular placement. For example, for each bid request for the particular placement received from a RTB exchange 16, bidding system 20 may (a) determine whether or not to submit a bid based on various other factors (e.g., a performance score for the particular placement, a current pacing threshold value, a geographic location (e.g., digital zip) of the end user (e.g., as determined from the IP address identified in the bid request, etc.), and if it is determined to submit a bid, (b) determine a bid price based on the win probability-sale price curve and/or the bid-price curve for the placement. As another example, bidding system 20 may use the win probability-sale price curve and/or bid-price curve for both (a) determining whether or not to submit a bid and (b) selecting the bid price, for each incoming bid request for the particular placement.

At 660, pricing management system 28 collects additional bid result data (including win/loss results and actual sale price of winning bids for the particular placement) based on the results of bids submitted by bidding system 20 for the particular placement during the course of the campaign. At 662, pricing management system 28 periodically and automatically adjusts the win probability-sale price curve and/or bid-price curve for the particular placement based on the additional bid result data collected at 660, e.g., by combining such data with the data (if any) obtained at step 652 prior to the start of the campaign. Pricing management system 28 may update the price curves at any suitable frequency, e.g., at regular time intervals or after each N bids submitted for the particular placement, for example.

In some embodiments or situations, pricing management system 28 may utilize a single win probability-sale price curve and/or bid-price curve for each placement, whether static or dynamically updated as discussed above.

In other embodiments or situations, pricing management system 28 may generate (and in some embodiments, dynamically update) multiple win probability-sale price curves and/or bid-price curves for an individual placement. The multiple probability-sale price curves and/or static bid-price curves for an individual placement may correspond to any logical segmentation, division, or categorization, e.g., (a) specific web page, (b) geography of the end user, (c) time of day, week, month, etc., (d) whether the end user has cookies enabled vs. non-enabled, (e) according to other known information regarding the end user. Each specific probability-sale price curve and/or static bid-price curve corresponding to a particular segmentation, division, or categorization may be generated based on bid result data collected on bids submitted in the context of that particular segmentation, division, or categorization. For example, a specific bid-price curve corresponding to end users from Chicago may be generated based on bid result data from bids submitted on bid results received from end users in Chicago (e.g., as identified from the IP addresses in the bid requests).

For example, pricing management system 28 may generate, for an individual placement, separate win probability-sale price curves and/or bid-price curves that are specific to multiple different web pages within the domain defined by the placement. For example, for a particular placement linked to the domain cnn.com, pricing management system 28 may generate distinct bid-price curves for different web sites within the foxnews.com domain, e.g., a first bid-price curve corresponding to cnn.com/world, a second bid-price curve corresponding to cnn.com/sports/football, a third bid-price curve corresponding to cnn.com/sports/baseball, etc.

As another example, pricing management system 28 may generate, for a particular placement, separate win probability-sale price curves and/or bid-price curves that are specific to different geographic areas (corresponding to the end user device loading the content that includes the placement), e.g., by country, state, city, trade zone, digital zip, or any other defined or custom-generated geographic areas. Bidding system 20 may determine a geographic location for each incoming bid request based on the IP address or other identifying information included in the bid request, e.g., by mapping the IP address to the corresponding end user device using any suitable mapping techniques, e.g., the mapping technique discussed in U.S. Pat. No. 8,799,062, col. 6, line 36 to col. 7, line 43, which disclosure is hereby incorporated by reference. For example, for a particular placement, pricing management system 28 may generate a first win probability-sale price curve and/or bid-price curve corresponding to Dallas, Tex. (based on historical bid results from bids submitted on bid requests originating from Dallas), a second win probability-sale price curve and/or bid-price curve corresponding to Houston, Tex. (based on historical bid results from bids submitted on bid requests originating from Houston), and a third win probability-sale price curve and/or bid-price curve corresponding to Austin, Tex. (based on historical bid results from bids submitted on bid requests originating from Austin).

As another example, pricing management system 28 may generate, for a particular placement, separate win probability-sale price curves and/or bid-price curves that are specific to different time periods, e.g., different times of the day, different days of the week, different months or seasons, or any other time period divisions. For example, for a particular placement, pricing management system 28 may generate a first win probability-sale price curve and bid-price curve for the time period 1:00 am to 5:59 am, and a second win probability-sale price curve and bid-price curve for the time period 6:00 am to 12:59 am, which may represent periods of significantly different traffic with respect to the particular placement or a relevant campaign.

As another example, pricing management system 28 may generate, for a particular placement, separate win probability-sale price curves and/or bid-price curves for users with cookies and users with no cookies (sometimes referred to as "transient" users). Auctions for users with cookies typically attract a higher sale price than auctions for users without cookies, such that the respective pricing curves for cookie users vs. cookie-less users may be significantly different.

Figure 13A:
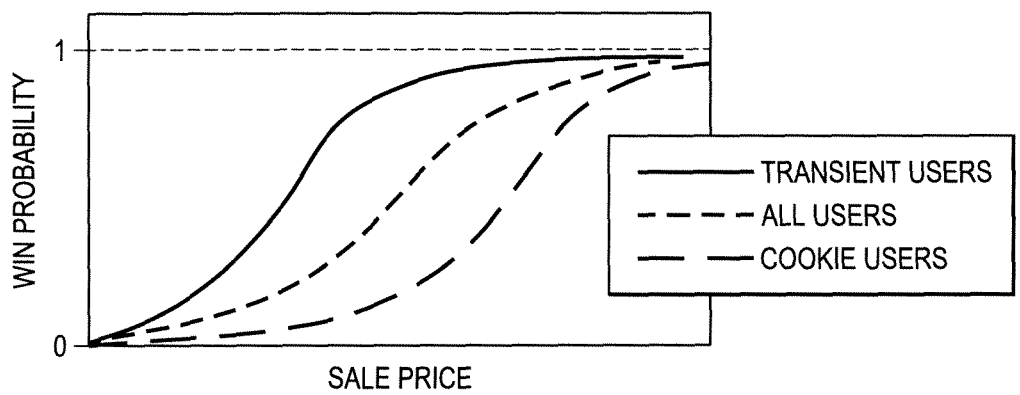
FIG. 13A illustrates a set of example win probability-sale price curves for a particular placement based on cookie-availability, according to one embodiment.

FIG. 13A illustrates example win probability-sale price curves for a particular placement based on cookie-availability, including (a) a first win probability-sale price curve 680A for cookie-available users, (b) a second win probability-sale price curve 680B for cookie-unavailable (transient) users, and (c) a third win probability-sale price curve 680C for all users (cookie-available and transient).

Figure 13B:
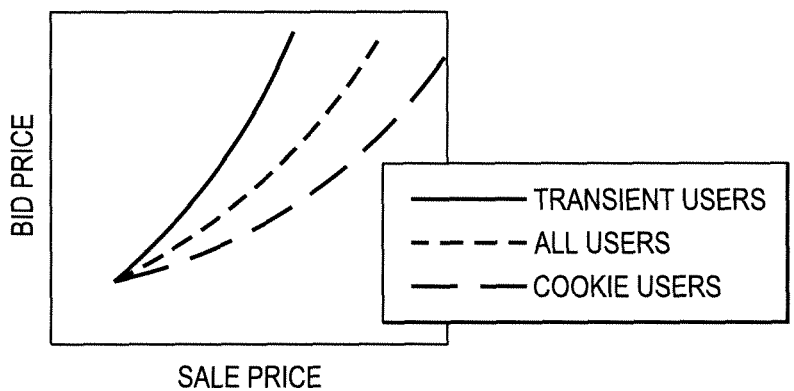
FIG. 13B illustrates a set of example win bid-price curves corresponding to the win probability-sale price curves shown in FIG. 13A, according to one embodiment.

FIG. 13B illustrates example bid-price curves corresponding to the win probability-sale price curves shown in FIG. 13A, including (a) a first bid-price curve 690A for cookie-available users, (b) a second bid-price curve 690B for cookie-unavailable (transient) users, and (c) a third bid-price curve 690C for all users (cookie-available and transient).

As another example, pricing management system 28 may generate, for a particular placement, separate win probability-sale price curves and/or bid-price curves that are specific to different categories of information regarding the end user (besides the geography and cookie-availability information discussed above). For example, in some embodiments, pricing management system 28 may track the internet usage for individual IP addresses (e.g., by recording incoming bid requests from such IP addresses over time), analyse such tracking data to identify one or more defined "user interests" (e.g., sports, news, automobiles, cooking, etc.) corresponding to each IP address. In such embodiments, pricing management system 28 may generate separate pricing curves (for the particular placement) corresponding to the different "user interests." For example, for an ad campaign for a sporting goods store, pricing management system 28 may generate, for each targeted placement, a first win probability-sale price curve and bid-price curve for IP addresses assigned to a "sports" interest category (based on the internet usage for such IP addresses) and a second win probability-sale price curve and bid-price curve for IP addresses not assigned to the "sports" interest category.

Pricing management system 28 may generate specific win probability-sale price curves and/or bid-price curves for any other segmentation, division, or categorization.

Further, pricing management system 28 may generate specific win probability-sale price curves and/or bid-price curves for any combination of two or more segmentations, divisions, or categorizations. For example, pricing management system 28 may generate specific pricing curves based on a combination of geography and cookie-availability. Thus, for instance, pricing management system 28 may generate a first bid-price curve for cookie-available users located in the U.S., a second bid-price curve for cookie-available users located outside the U.S., a third bid-price curve for cookie-unavailable users located in the U.S., and a fourth bid-price curve for cookie-unavailable users located outside the U.S.

In some embodiments, pricing management system 28 may determine whether to (a) partition the pricing data for a particular placement into multiple data sets for generating multiple specific pricing curves (as discussed above) for the placement or (b) keep the pricing data for the placement as a single data set for generating a single pricing curve for the placement, based on any suitable factors or algorithm. For example, pricing management system 28 may determine whether or not to partition the pricing data for a particular placement by analyzing metrics associated with the multiple specific pricing curves resulting from such data partition, e.g., to determine whether the specific pricing curves are sufficiently distinct from each other to justify the reduction in the data volume associated with the specific pricing curves (as compared to a single curve based on all pricing data for the placement). For example, pricing management system 28 may determine one or more metrics for each specific pricing curve for the placement (e.g., the mean and variance of multiple specific win probability-sale price curves for the placement), determining the difference in such metrics between the multiple specific curves, and compare the difference to a predefined threshold value to determine whether the curves are sufficient distinct to justify splitting the data into multiple datasets to implement the multiple specific curves for the particular placement.

Pricing management system 28 may use any suitable metrics to compare two or more pricing curves to each other, e.g., depending on the respective type(s) of curves being compared. For example, normal curves (or "log normal" curves), such as typical win probability-sale price curves, may be fully defined by the mean and variance of each curve, such that win probability-sale price curves may be compared to each other for similarity by comparing the mean and variance values of the curves at issue. Non-normal curves may be defined and compared using other suitable metrics.

In some instances, some pricing curves (including segmented pricing curves for particular placements and/or single-dataset pricing curves for particular placements) may suffer from data sparsity, such that the pricing curves are not robust. For example, a bid-price curve for a particular placement that is specific to (a) cookie users, (b) a particular geographic area, and (c) a specific time of day may suffer from significant data sparsity.

Pricing management system 28 may address this data sparsity issue by identifying and combining similar pricing curves according to any suitable rules and algorithms. For example, pricing management system 28 may jointly estimate a set of similar curves using the statistical tools to survival analysis regression, also referred to as "informational sharing." Pricing management system 28 may combine pricing curves having similar characteristics, whether such pricing curves relate to the same placement or to multiple different placements. For example, from a group of pricing curves (some or all of which may exhibit data sparsity), pricing management system 28 may identify pricing curves for multiple different placements that have similar characteristics (e.g., based on a predefined difference threshold), and thus combine the data underlying these multiple different pricing curves into a single, more robust pricing curve. As another example, pricing management system 28 may identify multiple specific pricing curves for the same placement that have similar characteristics—e.g., a first pricing curve specific to [cookie users, located in the US, and within a 6 pm-10 pm time segment], and a second pricing curve specific to [cookie users, located in Europe, and within a 10 am-6 pm time segment]- and thus combine the data underlying these specific pricing curves into a single, more robust pricing curve. As yet another example, pricing management system 28 may identify multiple specific pricing curves for multiple different placements that have similar characteristics—e.g., a first pricing curve specific to [transient users located in New York] for a first placement, and a second pricing curve specific to [cookie users, located in the U.S., and during Saturdays] for a second placement—and thus combine the data underlying these specific pricing curves into a single, more robust pricing curve.

In addition to addressing data sparsity issues, pricing curves may be combined in order to reduce required data storage regarding a group of curves and their underlying data. For example, as discussed above, pricing curves that are normal curves may be defined simply by the mean and variance of each curve, such that the data (or at least a portion of the data) underlying such curves need not be stored. Thus, by combining multiple pricing curves, pricing management system 28 may simply store a single mean and variance for the combined curve representing multiple pricing curves for one or more placements.

Pacing Optimization

Another aspect of the present system and method is pacing optimization. One of the significant challenges of achieving good campaign performance is correct pacing (hitting the daily impression/volume goal). Correct pacing also refers to using as few placements as possible so that only the very best placements are used. An optimal situation is where advertisements are served every minute of the day so that by the last minute of the day, the last few impressions that are needed to hit that day's impression quota/goal are being served.

One method for pacing optimization is to observe how many impressions a campaign served, how many placements it used, and which hours of the day it served. Because very different impression volumes occur every hour of the day, the system normalizes these numbers to estimate a placement velocity. Placement velocity refers to the average number of impressions that a placement will see throughout the day for a given campaign with a static set of DZs and a known point in the price distribution. Based on the number of impressions needed in the day, the system uses placement velocity to estimate the number placements needed to reach that goal.

Another method for pacing optimization may offer better pacing control from a mechanical point view because some campaigns run with hourly impression quotas that aim to meet a day's impression quota. To maximize the minutes served in the day, the system estimates the number of placements to assign a campaign for the day. Now, under this embodiment, the system estimates the number of impressions to allocate to each hour so as to fill each hour of the day. This is done by iteratively moving impression quota from hours that do not meet their quota to hours that meet their quota too quickly.

Yet another method for pacing optimization is to dynamically change the number of placements that are bid on periodically to adjust for volume fluctuations throughout the day.

According to another embodiment, the present system re-weights hours to bias impressions towards better performing hours. To ensure smooth serving throughout the day, the system assigns more placements to better performing hours compared to poorer performing hours. Each hour of the day performs equally well. In other words, for hours that perform well, the system selects below average performing advertisement placements as they will now perform adequately. Whereas for poor performing hours, the system drops some better placements as they will perform below what is needed. The system can perform this process for the optimization of DZs, as well.

Mixed Optimization

Another aspect of the present system and method is to apply some or all of the optimization methods discussed above simultaneously instead of in a tiered process in order to achieve a target performance metric at an efficient price point. As an example, the system provides a clear measure of how effective each placement, DZ and hour is. The system creates a final score that is, for instance, a function of placement, DZ and hour.

The core idea here is that there are K dimensions for optimizing performance (e.g. placement, time, DZ, demographics/audience attributes, etc.). The system is able to score each dimension alone. The extension of mixed optimization is (for each bid request) to estimate 1 score that jointly considers all other scores. Thus, it is some function F(score1, score2, . . . , scoreK).

According to one embodiment, the system computes a multiplicative score where each dimension is centered around 1. If the system (e.g., during a bid on an RTB exchange) identifies a DZ having a score of 1.5, an advertisement placement having a score of 1.2, and an hour having a score of 0.8, the final score for a bid request would be 1.44. If the system is targeting bid requests with a score greater than 1, the system would bid on this item. If too few impressions are being won, the system may increase the bid price to a maximum acceptable point, or lower the target score iteratively until impressions are won at the desired rate to meet that daily impression quota.

According to one embodiment, the present system and method provides an opportunity for bidders to consider or buy a rather poor performing placement that would never previously have been considered. The present method and system allows the bidders to place advertisements in a prime hour in the high performing DZ, thus providing more choices to bid with an improved performance.

Binomial Estimation for Eliminating Placements

As explained above, grouping advertisement placements into different advertisement segments allows probabilistic statements to be made because probabilistic statements require a sample. The present system solves the problem of determining the size of the sample required to make a probabilistic statement that is statistically significant. For instance, if X clicks are observed given Y impressions for an advertisement placement, the system ensures that the observed CTR of the advertisement placement is outperforming a target CTR ("tCTR").

It has been observed that clicks can be modeled fairly accurately under a binomial assumption. The probability p of an impression being clicked by a user is the same for each impression in the same set of impressions. Under the binomial assumption and setting p=tCTR, the probability P that the observed CTR ("oCTR") is greater than the target CTR (e.g., outperforming target CTR) is calculated by:

$$P(oCTR > tCTR) = \sum_{i=k}^{n} \frac{n!}{(n-i)!i!}(p^i)((1-p)^{n-i}),$$

where n is the number of observed impressions and k is the number of observed clicks.

To ensure that the observed CTR is large enough to support, for instance, at least a 20% confidence level (p value) that the observed CTR is outperforming the target CTR for a given number of observed impressions n, the number of observed clicks k is to be determined. To solve for k using the equation above takes significant computational resources. A less computationally intensive way to solve for k is to implement a look up table. However, given that k needs to be calculated for thousands or even millions of advertisement placements, lookup tables would not be a practical solution.

Figure 14:
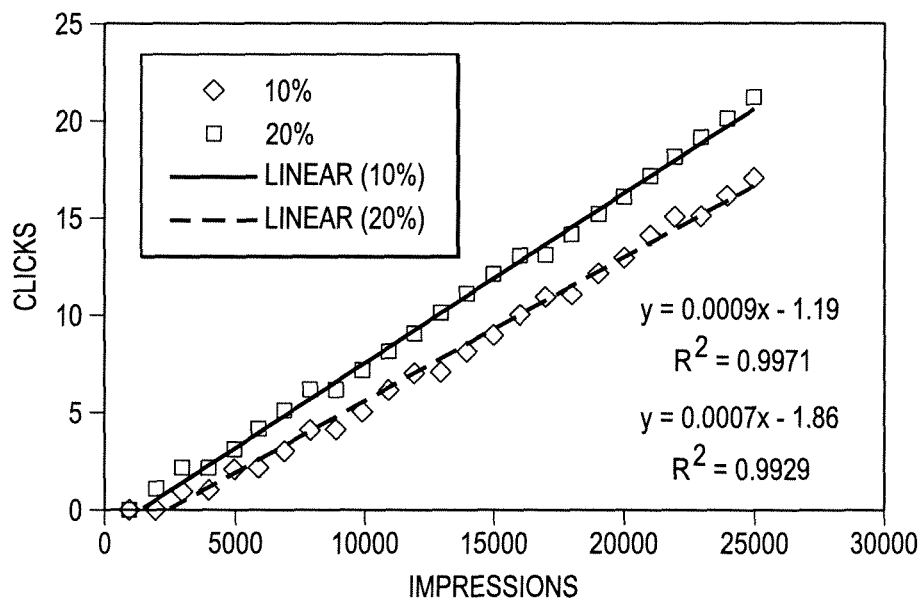
FIG. 14 illustrates an exemplary linear relationship for confidence levels 10% and 20% with tCTR=0.1%, according to one embodiment.

The present system and method provides efficient estimation for k without consuming much computational resources. The estimation for k is based on the observation that the number of observed clicks k for a given confidence level exhibits a linear relationship with respect to the number of impressions n. FIG. 14 illustrates an exemplary linear relationship for confidence levels 10% and 20% with tCTR=0.1%, according to one embodiment.

Figure 15:
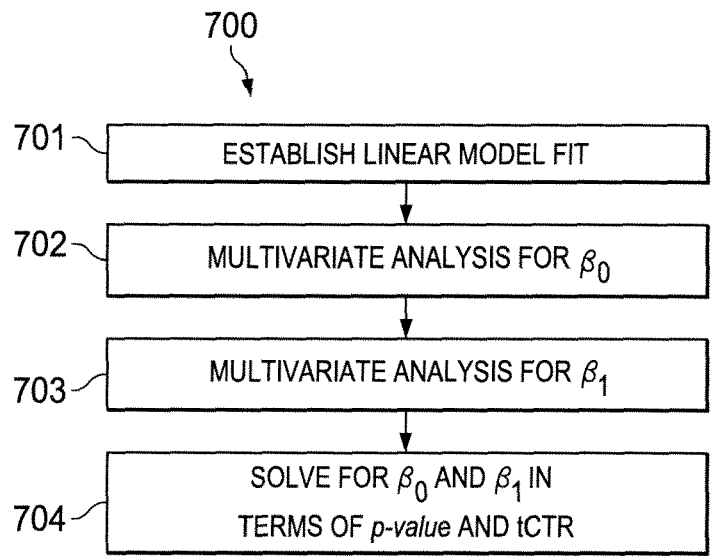
FIG. 15 illustrates a flow chart of an exemplary process for estimating the number of observed clicks for a given confidence level, according to one embodiment.

FIG. 15 illustrates a flow chart of an example method 700 for estimating the number of observed clicks k for a given confidence level, according to one embodiment. Starting at step 701, a linear model fit is established using data points calculated based on the equation for the probability P. The linear model fit yields coefficients $\beta_0$, $\beta_1$ and $\beta_2$.

$$\text{clicks confidence boundary} = \alpha_0 + \beta_1 + \sqrt{\text{impressions}} + \beta_2 \times \text{impressions}.$$

At step 702, a multivariate regression analysis is performed on the coefficient $\beta_0$ where the p-value and the tCTR are the explanation variables, where $$\beta_0 = tCTR + p\text{value}$$

$$\beta_1 = tCTR; \text{ and}$$

$$\beta_2 = p\text{value}.$$

During the multivariate regression analysis, more coefficient $\beta_0$ values may be calculated by varying p-value and tCTR. Step 701 is repeated to yield a set of coefficients $\beta_0$ and $\beta_1$. Similarly, at step 703, another multivariate regression analysis is performed on the coefficient $\beta_1$ where the p-value and the tCTR are the explanation variables using the set of coefficients $\beta_0$ that are already calculated at step 702. Finally, at step 704, coefficients $\beta_0$ and $\beta_1$ are solved for in terms of p-value and tCTR and plugged back into the linear model fit established in step 701.

It is noted that the above description regarding FIGS. 14 and 15 illustrates one example according to one embodiment, and other variations to the multivariate regression analysis may be used without deviating from the scope of the present subject matter. For example, it is possible to define and approximate a four-dimensional space {p-value, CTR, impressions, clicks} or in terms of a binomial theory {p-value, p, trials, successes}. Instead of the discrete binomial equation to solve for confidence intervals, the four-dimensional space is approximated with a series of linear equations. When three of the four components of the four-dimensional space are known, it becomes a simple multiplication problem. As a result, given the three components including the desired target CTR, the level of confidence, and the number of impressions served, simple multiplication operations determine the minimum number of clicks needed for that target CTR to be true or better than the desired target CTR. Using these results, the present system decides with reasonable certainty when to stop bidding on a given placement based on the likelihood that its performance is below the desired target CTR for that campaign. When the system stops bidding, it would be better to start fresh bidding on a new placement that was chosen from the previously described estimation/recommendation system.

Figure 16:
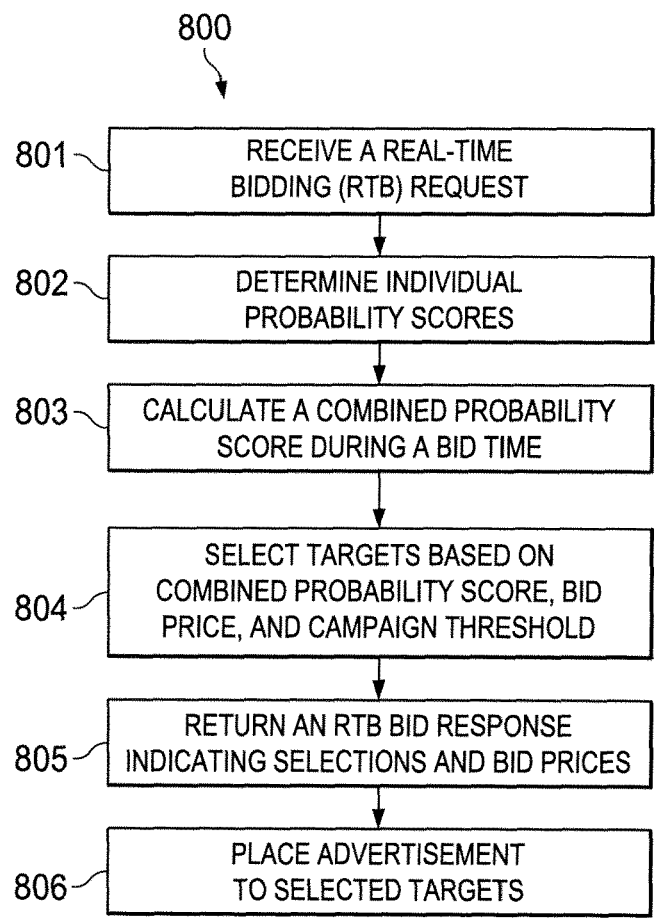
FIG. 16 illustrates a flow-chart of an exemplary process for calculating a combined probability score, according to one embodiment.

FIG. 16 illustrates a flow-chart of an example method 800 for calculating a combined probability score, according to one embodiment. An RTB system receives a real-time bidding (RTB) request from an advertisement exchange that desires to place an online advertisement campaign (801). The RTB system determines individual probability scores (802). During a bid time, when a target appears and/or becomes available for placing an impression for the campaign, the RTB system calculates a combined probability score (803). The RTB system then selects targets for placing an impression based on the combined probability score, the bid price, and the campaign threshold (804). The RTB system returns a RTB bid response to bidders with selections made and the bid prices (805). The RTB system finally places the impression to the available targets and updates the target count (806).

Figure 18:
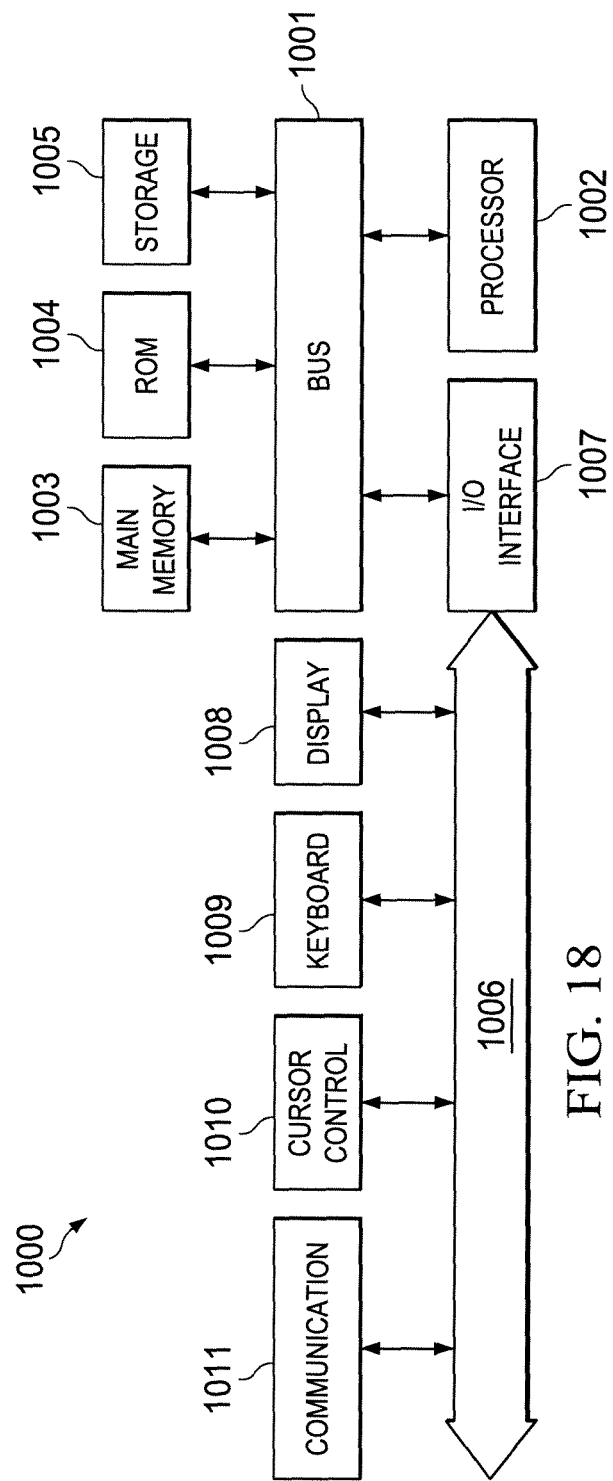
FIG. 18 illustrates an example computer architecture that may be used for embodiments of the present system.

FIG. 18 illustrates an example computer architecture that may be used for the present system, according to one embodiment. The example computer architecture may be used for implementing one or more components described in the present disclosure including, but not limited to, the present system. One embodiment of architecture 1000 includes a system bus 1001 for communicating information, and a processor 1002 coupled to bus 1001 for processing information. Architecture 1000 further includes a random access memory (RAM) or other dynamic storage device 1003 (referred to herein as main memory), coupled to bus 1001 for storing information and instructions to be executed by processor 1002. Main memory 1003 also may be used for storing temporary variables or other intermediate information during execution of instructions by processor 1002. Architecture 1000 may also include a read only memory (ROM) and/or other static storage device 1004 coupled to bus 1001 for storing static information and instructions used by processor 1002.

A data storage device 1005 such as a magnetic disk or optical disc and its corresponding drive may also be coupled to architecture 1000 for storing information and instructions. Architecture 1000 can also be coupled to a second I/O bus 1006 via an I/O interface 1007. A plurality of I/O devices may be coupled to I/O bus 1006, including a display device 1008, an input device (e.g., an alphanumeric input device 1009 and/or a cursor control device 1010).

The communication device 1011 allows for access to other computers (e.g., servers or clients) via a network. The communication device 1011 may include one or more modems, network interface cards, wireless network interfaces or other interface devices, such as those used for coupling to Ethernet, token ring, or other types of networks.

The above example embodiments have been described herein above to illustrate various embodiments of implementing a system and method for estimating an advertisement impression volume. Various modifications and departures from the disclosed example embodiments will occur to those having ordinary skill in the art. The subject matter that is intended to be within the scope of the present disclosure is set forth in the following claims.

The invention claimed is:

1. A bidding system for automated closed-loop control of a campaign for bidding on online placements in an automated real-time online auction system during the loading or rendering of network-based digital content, the bidding system comprising:

at least one processor; and computer-readable instructions stored in non-transitory computer readable medium and executable by the at least one processor to:

collect placement-specific bid result data for a plurality of bids submitted by the bidding system for a particular placement, the plurality of bids including a first subset of bids submitted for bid requests that include browser cookie information regarding a respective user device and a second subset of bid submitted for bid requests that do not include browser cookie information regarding a respective user device, the placement-specific bid result data for the plurality of bids indicating (a) whether each submitted bid for the particular placement was successful and (b) for each successful bid, an actual sale price for the particular placement as determined by a respective RTB exchange;

automatically segment the placement-specific bid result data into at least (a) cookie-available bid result data associated with the first subset of submitted bids and (b) cookie-unavailable associated with the second subset of submitted bids;

automatically generate at least (a) a cookie-available pricing curve for the particular placement based on the segmented cookie-available bid result data and (b) a cookie-unavailable pricing curve for the particular placement based on the segmented cookie-unavailable bid result data;

receive from an RTB exchange, via a communications network, a series of bid requests during the execution of a campaign, each received bid request identifying a respective placement in digital content being loaded or rendered by an internet-connected device; and for a received bid request that identifies the particular placement, in real-time during the loading or rendering of the respective digital content:

identify whether the bid request includes browser cookie information;

determine whether to submit a bid; and if the bid request includes browser cookie information, determining a bid price for the bid based at least on the cookie-available pricing curve for the particular placement;

if the bid request does not include browser cookie information, determining a bid price for the bid based at least on the cookie-unavailable pricing curve for the particular placement;

if it is determined to submit a bid, submit the bid, including the determined bid price, to a respective real-time online bidding exchange.

2. The bidding system of claim 1, wherein the computer-readable instructions are further executable to:

identify multiple different pricing curves for one or more placements having similar curve characteristics;

combine the multiple different pricing curves into a combined pricing curve; and implement the combined pricing curve for use during the campaign.

\* \* \* \* \*